US007510476B2

(12) United States Patent
Kobayashi

(10) Patent No.: US 7,510,476 B2
(45) Date of Patent: Mar. 31, 2009

(54) GAMING MACHINE WITH A DISPLAY CONTROLLER FOR ALTERNATIVELY EXECUTING AN EFFECT AND DISPLAYING A FIRST GAME OR ALTERNATIVELY EXECUTING THE EFFECT AND A SECOND GAME

(75) Inventor: Masatsugu Kobayashi, Tokyo (JP)

(73) Assignee: Aruze Corp., Tokyo (JP)

( * ) Notice: Subject to any disclaimer, the term of this patent is extended or adjusted under 35 U.S.C. 154(b) by 379 days.

(21) Appl. No.: 10/926,039

(22) Filed: Aug. 26, 2004

(65) Prior Publication Data

US 2005/0049046 A1 Mar. 3, 2005

(30) Foreign Application Priority Data

Aug. 29, 2003 (JP) .............................. 2003-306489

(51) Int. Cl.
*A63F 13/00* (2006.01)

(52) U.S. Cl. .............................. 463/31; 463/20; 349/58

(58) Field of Classification Search .................. 463/31, 463/20; 349/58

See application file for complete search history.

(56) References Cited

U.S. PATENT DOCUMENTS

| | | | | |
|---|---|---|---|---|
| 4,718,672 | A * | 1/1988 | Okada | 463/20 |
| 5,530,571 | A | 6/1996 | Chen et al. | |
| 5,580,055 | A * | 12/1996 | Hagiwara | 273/143 R |
| 6,075,649 | A * | 6/2000 | Naito | 359/619 |
| 6,191,833 | B1 * | 2/2001 | Hirakata | 349/61 |
| 6,443,583 | B1 * | 9/2002 | Ha | 362/608 |
| 6,517,433 | B2 * | 2/2003 | Loose et al. | 463/20 |
| 6,517,437 | B1 * | 2/2003 | Wells et al. | 463/30 |
| 6,722,979 | B2 * | 4/2004 | Gilmore et al. | 463/20 |

(Continued)

FOREIGN PATENT DOCUMENTS

JP 08-080364 A 7/1996

(Continued)

OTHER PUBLICATIONS

Muir, Robert Linley et al., WO 03/039699 A1, International Publication Date May 15, 2003.*

(Continued)

*Primary Examiner*—Corbett Coburn
*Assistant Examiner*—William McCulloch
(74) *Attorney, Agent, or Firm*—Rader, Fishman & Grauer, PLLC

(57) ABSTRACT

A gaming machine includes an effect display device for displaying either an effect or a first game thereon, a variable display device arranged behind the effect display device, a game controller for executing the first game utilizing the effect display device and a second game utilizing the variable display device and a display controller for controlling light transmittance of the effect display device so that the variable display device is selectively seen and recognized through the effect display device. The display controller alternatively executes the effect and displays the first game when the game controller determines to alternatively conduct the effect and display the first game while simultaneously concealing the variable display device or the display controller alternatively executes the effect and the second game when the game controller determines to alternatively conduct the effect and display the second game while simultaneously prohibiting display of the first game.

11 Claims, 24 Drawing Sheets

U.S. PATENT DOCUMENTS

| | | | | |
|---|---|---|---|---|
| 6,937,298 | B2 * | 8/2005 | Okada | 349/58 |
| 7,083,316 | B2 * | 8/2006 | Lin | 362/606 |
| 7,159,865 | B2 * | 1/2007 | Okada | 273/143 R |
| 7,207,883 | B2 * | 4/2007 | Nozaki et al. | 463/24 |
| 7,219,893 | B2 * | 5/2007 | Tanimura et al. | 273/143 R |
| 7,220,181 | B2 * | 5/2007 | Okada | 463/32 |
| 7,281,980 | B2 * | 10/2007 | Okada | 463/20 |
| 7,309,284 | B2 * | 12/2007 | Griswold et al. | 463/29 |
| 7,329,181 | B2 * | 2/2008 | Hoshino et al. | 463/20 |
| 7,355,660 | B2 * | 4/2008 | Ikeda | 349/60 |
| 7,390,259 | B2 * | 6/2008 | Okada | 463/20 |
| 7,404,766 | B2 * | 7/2008 | Adachi et al. | 463/31 |
| 2001/0031658 | A1 | 10/2001 | Ozaki et al. | |
| 2002/0154265 | A1 | 10/2002 | Hubby, Jr. | |
| 2002/0173354 | A1 * | 11/2002 | Winans et al. | 463/20 |
| 2003/0016313 | A1 * | 1/2003 | Jeong | 349/58 |
| 2003/0027624 | A1 * | 2/2003 | Gilmore et al. | 463/20 |
| 2003/0087690 | A1 * | 5/2003 | Loose et al. | 463/20 |
| 2004/0029636 | A1 * | 2/2004 | Wells | 463/32 |
| 2004/0063490 | A1 * | 4/2004 | Okada | 463/20 |
| 2004/0116178 | A1 * | 6/2004 | Okada | 463/20 |
| 2004/0150162 | A1 * | 8/2004 | Okada | 273/292 |
| 2004/0162146 | A1 * | 8/2004 | Ooto | 463/46 |
| 2004/0207154 | A1 * | 10/2004 | Okada | 273/138.1 |
| 2004/0209678 | A1 * | 10/2004 | Okada | 463/30 |
| 2004/0209692 | A1 * | 10/2004 | Schober et al. | 463/42 |
| 2004/0214635 | A1 * | 10/2004 | Okada | 463/30 |
| 2005/0049032 | A1 * | 3/2005 | Kobayashi | 463/20 |
| 2005/0049046 | A1 * | 3/2005 | Kobayashi | 463/31 |
| 2005/0153775 | A1 * | 7/2005 | Griswold et al. | 463/30 |
| 2005/0192090 | A1 * | 9/2005 | Muir et al. | 463/30 |

FOREIGN PATENT DOCUMENTS

JP 2001-347042 A 12/2001

OTHER PUBLICATIONS

European Search Report

* cited by examiner

FIG.8A

RIGHT REEL (BASE GAME)

| CODE NUMBER | RANDOM NUMBER VALUE |
|---|---|
| 0 | 0~15 |
| 1 | 16~25 |
| 2 | 26~36 |
| 3 | 37~46 |
| 4 | 47~52 |
| 5 | 53~63 |
| 6 | 64~80 |
| 7 | 81~91 |
| 8 | 92~103 |
| 9 | 104~115 |
| 10 | 116~127 |

FIG.8B

LEFT REEL (BASE GAME)

| CODE NUMBER | RANDOM NUMBER VALUE |
|---|---|
| 0 | 0~15 |
| 1 | 16~25 |
| 2 | 26~36 |
| 3 | 37~46 |
| 4 | 47~52 |
| 5 | 53~63 |
| 6 | 64~80 |
| 7 | 81~91 |
| 8 | 92~103 |
| 9 | 104~115 |
| 10 | 116~127 |

FIG.8C

CENTER REEL (BASE GAME)

| CODE NUMBER | RANDOM NUMBER VALUE |
|---|---|
| 0 | 0 |
| 1 | 1~15 |
| 2 | 16~20 |
| 3 | 21~32 |
| 4 | 33~45 |
| 5 | 46~53 |
| 6 | 54~64 |
| 7 | 65~71 |
| 8 | 72~82 |
| 9 | 83~120 |
| 10 | 121~127 |

FIG.9

BASE GAME

| CODE NUMBER | | | WINNING COMBINATION | PAYOUT |
|---|---|---|---|---|
| RIGHT REEL | CENTER REEL | LEFT REEL | | |
| ANY | 0 | ANY | JOKER | TRIGGER TO FREE GAME |
| 4 or 9 | 4 or 9 | 4 or 9 | 7 − 7 − 7 | 100 |
| 1 or 7 | 1 or 7 | 1 or 7 | 3BAR−3BAR−3BAR | 5 |
| 3 or 8 | 3 or 8 | 3 or 8 | 2BAR−2BAR−2BAR | 3 |
| 5 or 10 | 5 or 10 | 5 or 10 | BAR−BAR−BAR | 2 |
| 2 | 2 | 2 | CHERRY−CHERRY−CHERRY | 1 |
| COMBINATION OTHER THAN ABOVE COMBINATIONS | | | LOSS OF WINNING COMBINATION | 0 |

FIG.10A

RIGHT REEL (FREE GAME)

| CODE NUMBER | RANDOM NUMBER VALUE |
|---|---|
| 0 | 0~31 |
| 1 | 32~63 |
| 2 | 64~95 |
| 3 | 96~127 |

FIG.10B

CENTER REEL (FREE GAME)

| CODE NUMBER | RANDOM NUMBER VALUE |
|---|---|
| 0 | 0~15 |
| 1 | 16~63 |
| 2 | 64~79 |
| 3 | 80~127 |

FIG.10C

LEFT REEL (FREE GAME)

| CODE NUMBER | RANDOM NUMBER VALUE |
|---|---|
| 0 | 0~12 |
| 1 | 13~47 |
| 2 | 48~85 |
| 3 | 86~127 |

FIG.11

| CODE NUMBER | | | WINNING COMBINATION | PAYOUT |
|---|---|---|---|---|
| RIGHT REEL | CENTER REEL | LEFT REEL | | |
| 0or1or2or3 | 0or2 | 0 | 7 - 7 - Tr | 300 |
| 0or1or2or3 | 0or2 | 1 | 7 - 7 - Do | 200 |
| 0or1or2or3 | 0or2 | 2 | 7 - 7 - 7 | 100 |
| COMBINATION OTHER THAN ABOVE COMBINATIONS | | | LOSS OF WINNING COMBINATION | 0 |

FIG.12A

BASE GAME

| CODE NUMBER | RANDOM NUMBER VALUE |
|---|---|
| 0 | 0 |
| 1 | 1 |
| 2 | 2 |
| 3 | 3 |
| 4 | 4 |
| 5 | 5 |
| 6 | 6 |
| 7 | 7 |
| 8 | 8 |
| 9 | 9 |
| 10 | 10 |

FIG.12B

| WINNING COMBINATION | BASE GAME | | 10 | 20 | 30 |
|---|---|---|---|---|---|
| | PAUOUT NUMBER | WINNING PROBABILITY | | | |
| 7 - 7 - 7 | 100 | 0.60% | 6 | 12 | 18 |
| 3BAR-3BAR-3BAR | 5 | 0.60% | 0.30 | 0.60 | 1.80 |
| 2BAR-2BAR-2BAR | 3 | 0.60% | 0.18 | 0.36 | 0.54 |
| BAR - BAR - BAR | 2 | 0.60% | 0.12 | 0.24 | 0.36 |
| CHERRY-CHERRY-CHERRY | 1 | 0.08% | 0.01 | 0.02 | 0.02 |
| PAYOUT EXPECTATION VALVE | | | 6.61 | 13.22 | 20.72 |

FIG.13A

FREE GAME

| CODE NUMBER | RANDOM NUMBER VALUE |
|---|---|
| 0 | 0 |
| 1 | 1 |
| 2 | 2 |
| 3 | 3 |

FIG.13B

| WINNING COMBINATION | FREE GAME | | 10 | 20 | 30 |
|---|---|---|---|---|---|
| | PAUOUT NUMBER | WINNING PROBABILITY | | | |
| 7 - 7 - Tr | 300 | 9.38% | 281.3 | 562.5 | 843.8 |
| 7 - 7 - Do | 200 | 9.38% | 187.5 | 375.0 | 562.5 |
| 7 - 7 - 7 | 100 | 9.38% | 93.8 | 187.5 | 281.3 |
| PAYOUT EXPECTATION VALVE | | | 562.5 | 1125 | 1687.5 |

FIG.19

| FREE GAME | SHIFT EFFECT PATTERN |
|---|---|
| 0~2 | EFFECT PATTERN 1 |
| 3~15 | EFFECT PATTERN 2 |
| 16~63 | EFFECT PATTERN 3 |

FIG.27

| RANDOM NUMBER VALUE | WINNING COMBINATION | PAYOUT |
|---|---|---|
| 0～9 | JOKER | FREE GAME |
| 10～32 | 7 - 7 - 7 | 100 |
| 33～35 | 3BAR - 3BAR - 3BAR | 5 |
| 36～58 | 2BAR - 2BAR - 2BAR | 3 |
| 59～203 | BAR - BAR - BAR | 2 |
| 204～257 | CHERRY-CHERRY-CHERRY | 1 |
| 258～1270 | LOSS OF WINNING COMBINATION | 0 |

FIG.28

| RANDOM NUMBER VALUE | WINNING COMBINATION | PAYOUT |
|---|---|---|
| 0～11 | 7 - 7 - Tr | 300 |
| 12～49 | 7 - 7 - Do | 200 |
| 50～87 | 7 - 7 - 7 | 100 |
| 88～127 | LOSS OF WINNING COMBINATION | 0 |

GAMING MACHINE WITH A DISPLAY CONTROLLER FOR ALTERNATIVELY EXECUTING AN EFFECT AND DISPLAYING A FIRST GAME OR ALTERNATIVELY EXECUTING THE EFFECT AND A SECOND GAME

CROSS-REFERENCE TO THE RELATED APPLICATION (S)

This application is based upon and claims a priority from the prior Japanese Patent Application No. 2003-306489 filed on Aug. 29, 2003, the entire contents of which are incorporated herein by reference. This application is related to co-pending U.S. patent application entitled to "GAMING MACHINE", which is based upon and claims a priority from the prior Japanese Patent Application No. 2003-306000, which was filed on Aug. 29, 2003 and the inventor of which is Masatsugu KOBAYASHI.

BACKGROUND OF THE INVENTION

1. Field of the Invention

The present invention relates to a gaming machine which has an effect display device and a variable display device arranged behind the effect display device.

2. Description of Related Art

The conventional gaming machine, for example, a slot machine, is constructed so that medals and the like are paid out corresponding to a predetermined symbol combination when symbols variably displayed are stopped and displayed on a pay line with the predetermined symbol combination. Here, in many cases, the symbols, which are variably displayed, are formed on an outer periphery of a reel rotatably supported in the gaming machine, as shown, for example, in Japanese Unexamined Publication No. 2001-347042. And recently, there are many cases that the symbols are projected on a display plane of a liquid crystal display device adopted in a so-called video slot machine.

Considering the above situation, it will be conceivable a gaming machine that both the liquid crystal display and the reels are provided in the same gaming machine. Thereby, a player can continuously enjoy different games by shifting the game done on the liquid crystal display device to the game done on the reels or the game done on the reels to the game done on the liquid crystal display device.

However, in a case that both the liquid crystal display device and the reels are arranged in the gaming machine in a state that the player can always see those, the player can easily infer contents and progress of the game, therefore interest for games is reduced.

SUMMARY OF THE INVENTION

The present invention has been done to dissolve the above problems and has an object to provide a gaming machine in which a first game utilizing an effect display device such as a liquid crystal display device and a second game utilizing a variable display device such as reels are executed, and interest for the second game done on the variable display device can be highly maintained by contriving a display mode that the variable display device arranged behind the liquid crystal display device is able to be recognized.

According to one aspect of the present invention, it is provided a gaming machine comprising:

an effect display device for displaying an effect thereon;

a variable display device arranged behind the effect display device;

a game controller for executing a first game utilizing the effect display device and a second game utilizing the variable display device;

a display controller for controlling light transmittance of the effect display device so that the variable display device is seen and recognized through the effect display device;

wherein the display controller executes the effect while the first game is executed by controlling the light transmittance of the effect display device when the game controller determines to conduct the effect by utilizing the display controller and conceals the variable display device except for a case that the game controller determines to conduct the effect by utilizing the display controller or a case that the second game is executed.

According to the gaming machine, the display controller executes the effect while the first game is executed by controlling the light transmittance of the effect display device when the game controller determines to conduct the effect by utilizing the display controller and conceals the variable display device except for a case that the game controller determines to conduct the effect by utilizing the display controller or a case that the second game is executed. Therefore, interest for the second game can be highly raised and variegated effect can be done.

The above and further objects and novel features of the invention will more fully appear from the following detailed description when the same is read in connection with the accompanying drawings. It is to be expressly understood, however, that the drawings are for purpose of illustration only and not intended as a definition of the limits of the invention.

BRIEF DESCRIPTION OF THE DRAWINGS

The accompanying drawings, which are incorporated in and constitute a part of this specification illustrate embodiments of the invention and, together with the description, serve to explain the objects, advantages and principles of the invention.

In the drawings,

FIGS. 8A, 8B and 8C are explanatory views showing lottery tables based on which the symbols to be stopped and displayed on three variable display portions are determined when the base game is conducted while utilizing three variable display portions, FIG. 9 is an explanatory view showing correspondence between winning combinations and payouts when the base game is conducted while utilizing three variable display portions, FIGS. 10A, 10B and 10C are explanatory views showing lottery tables based on which the symbols stopped and displayed on the reels, the symbols being seen and recognized through the variable display portions, are determined when the free game is conducted while utilizing three variable display portions and reels, FIG. 11 is an explanatory view showing correspondence between winning combinations and payouts when the free game is conducted while utilizing three variable display portions and reels, FIGS. 12A and 12B are explanatory views showing payout expectation values in the base game, FIGS. 13A and 13B are explanatory views showing payout expectation values in the free game, FIG. 19 is an explanatory view showing a lottery table for a shift effect process when the free game is executed by utilizing three variable display portions, FIG. 27 is an explanatory view of a lottery table showing correspondence between winning combinations and payouts when the base game is conducted while utilizing three variable display portions, and FIG. 28 is an explanatory view of a lottery table showing correspondence between winning combinations and payouts when the free game is conducted while utilizing three variable display portions and reels.

DETAILED DESCRIPTION OF THE PREFERRED EMBODIMENTS

Figure 1:
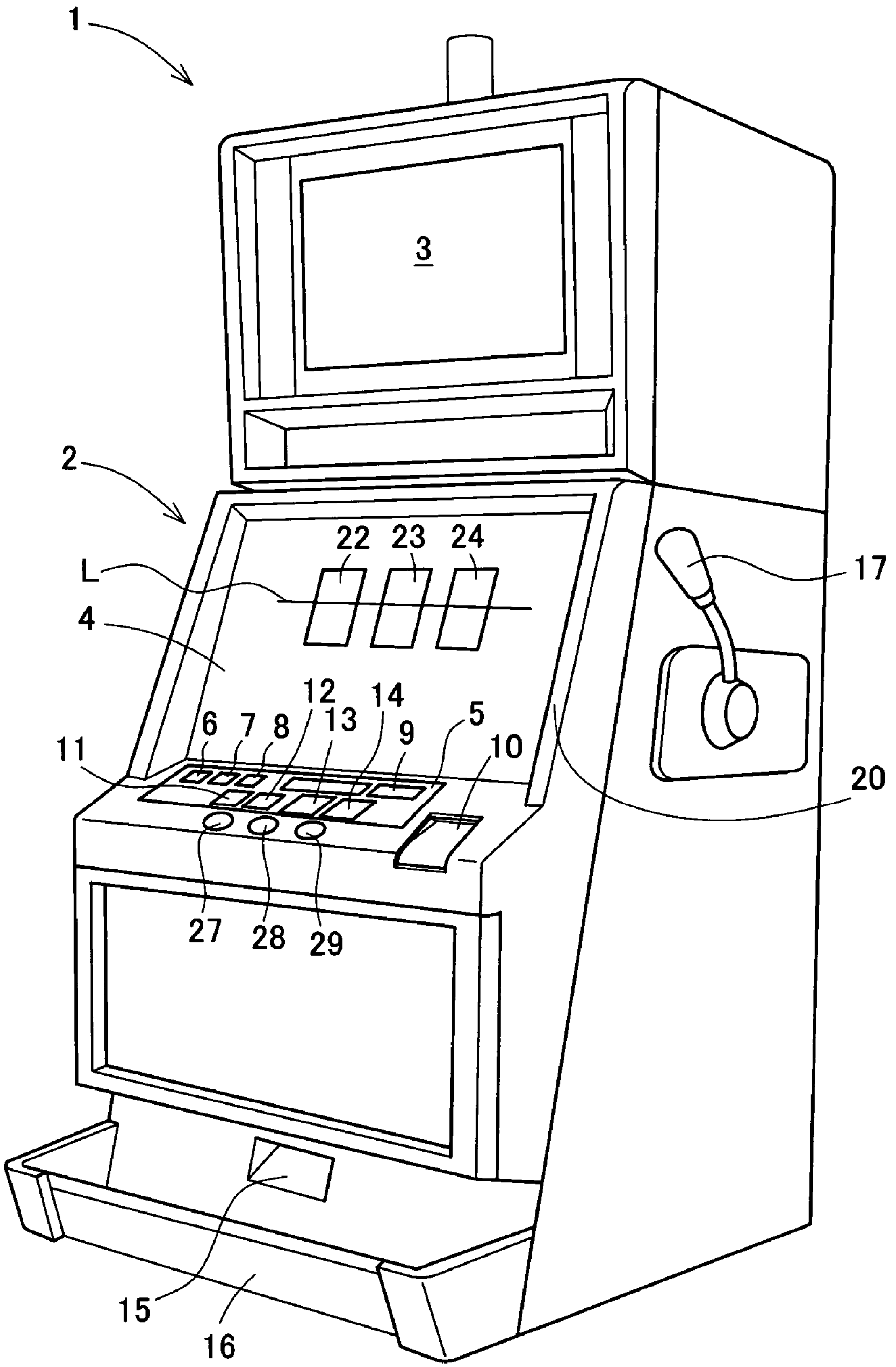
FIG. 1 is a perspective view showing a slot machine.
Figure 4:
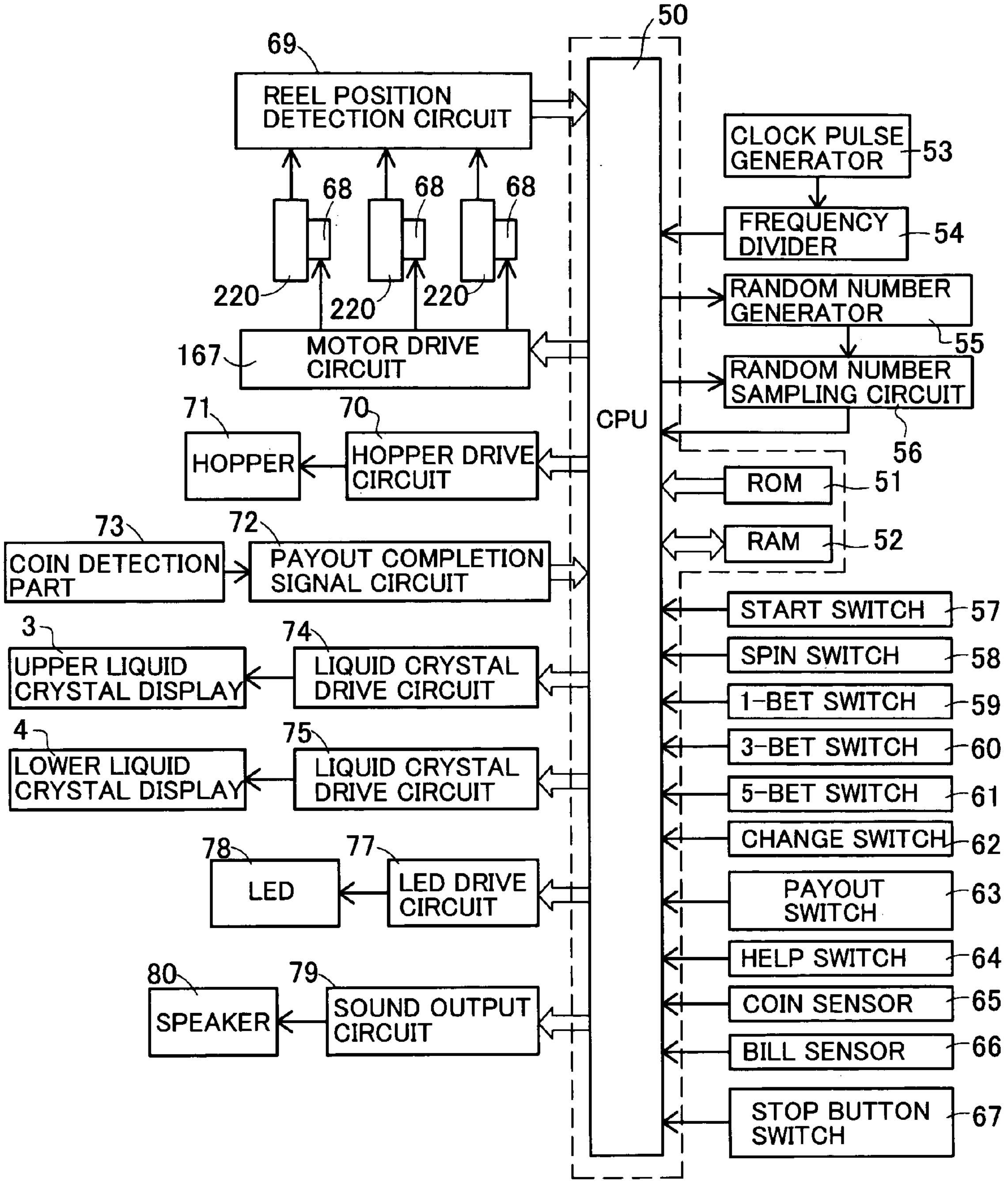
FIG. 4 is a block diagram schematically showing a control system of the slot machine.

Hereinafter, as the gaming machine according to the present invention, the embodiment embodying the present invention in the slot machine will be described with reference to the drawings. First, an outline construction of the slot machine according to the embodiment will described with reference to FIGS. 1 and 4. FIG. 1 is a perspective view of the slot machine. FIG. 4 is a block diagram schematically showing a control system in the slot machine In FIG. 1, the slot machine 1 has a cabinet 2 constructing a whole of the slot machine 1. At a front upper part of the cabinet 2 an upper liquid crystal display 3 is arranged, and at a front central part of the cabinet 2 a lower liquid crystal display 4 is arranged. Here, the upper liquid crystal display 3 is constructed from a liquid crystal display device which is generally used, and the lower liquid crystal display 4 is constructed from, so-called, a transparent liquid crystal display device. On the upper liquid crystal display 3, game operation method, kinds of winning combinations and payout therefor and information concerning with the game such as various effects thereof are displayed. And on the lower liquid crystal display 4, as shown in FIG. 1, three variable display portions 22, 23 and 24 are basically displayed and various symbols (mentioned later) are scrolled to the downward direction from the upward direction while being variably displayed on each of the variable display portions 22 to 24. Here, the detailed construction of the lower liquid crystal display 4 will be described hereinafter.

A control panel 5, which is projected frontward, is formed below the lower liquid crystal display 4, and from the most left side on the control panel 5, a change button 6, a payout (cashout) button 7, a help button 8 are arranged. And a coin insertion slot 9 and a bill insertion portion 10 are arranged at the right side of help button 8. Further, from the left side, a 1-BET button 11, a SPIN/REPEAT BET button 12, a 3-BET button 13 and a 5-BET button 14 are positioned at the front side on the control panel 5.

Here, the change button 6 is pressed when exchanging the bill inserted in the bill insertion portion 10, and the exchanged coins are paid out through a coin payout chute 15 to a coin tray 16 which is formed at the lower part of the cabinet 2. To the change button 6, a change switch 62 (explained hereinafter) is attached, and a switch signal is output to a CPU 50 from the change switch 62 based on press of the change button 6.

The payout button 7 is usually pressed when games are terminated, and when the payout button 7 is pressed coins got in games are paid out through the coin payout chute 15 to the coin tray 16. Here, to the payout button 7, a payout (cashout) switch 63 (mentioned hereinafter) is attached and a switch signal is output to the CPU 50 from the payout switch 63 based on press of the payout button 7.

The help button 8 is pressed when the player cannot understand game operation method, and when the help button 8 is pressed, various help information is displayed on the upper liquid crystal display 3 or the lower liquid crystal display 4. To this help button 8, a help switch 64 (mentioned hereinafter) is attached and a switch signal is output to the CPU 50 from the help switch 64 based on press of the help button 8.

To the coin insertion slot 9, a coin sensor 65 (mentioned hereinafter) is positioned, and when the coin is inserted in the coin insertion slot 9 a coin detection signal is output to the CPU 50 through the coin sensor 65. And to the bill insertion portion 10 a bill sensor 66 (mentioned hereinafter) is positioned, and when the bill is inserted in the bill insertion portion 10 a bill detection signal is output to the CPU 50 through the bill sensor 66.

As for the 1-BET button 11, every the 1-BET button is pressed one credit is betted, and to the 1-BET button 11, a 1-BET switch 59 is attached and when the 1-BET button 11 is pressed a switch signal is output to the CPU 50 from the 1-BET switch 59 based on press of the 1-BET button 11.

The SPIN/REPEAT BET button 12 is the button to start games from the present bet number or the previous bet number by press thereof, thereby variable display of the symbols is started on the variable display portions 21 to 25 of the lower liquid crystal display 4. To the SPIN/REPEAT BET button 12, a spin switch 58 (mentioned later) is attached, and when the SPIN/REPEAT BET button 12 is pressed a switch signal is output to the CPU 50 from the spin switch 58 based on press of the SPIN/REPEAT BET button 12. Here, as the bet number which can be betted by press of the SPIN/REPEAT BET button 12, there may exist 1, 2, 3 and 5 bets.

The 3-BET button 13 is the button to start games from 3 bets on the basis of press thereof. To this 3-BET button 13, a 3-BET switch 60 (mentioned hereinafter) is attached and when the 3-BET button 13 is pressed a switch signal is output to the CPU 50 from the 3-BET switch 60. And the 5-BET button 14 is the button to start games from 5 bets on the basis of press thereof. To the 5-BET button 12, a 5-BET switch 61 is attached and when the 5-BET button is pressed a switch signal is output to the CPU 50 from the 5-BET switch 61 on the basis of press thereof.

Further, at the lower part of the cabinet 2, the coin payout chute 15 is formed and the coin tray 16 to receive coins paid out from the coin payout chute 15 is provided. In the coin payout chute 15, a coin detection part 73 constructed from a sensor and the like is positioned and the coin detection part 73 detects the number of coins paid out from the coin payout chute 15.

At the most front side of the control panel 5, stop buttons 27 to 29 are provided corresponding to each of the variable display portions 22 to 24, respectively. Here, as mentioned hereinafter, although these stop buttons are pressed when the symbols, which are scrolled on the variable display portions, are stopped and displayed thereon, the symbols cannot be stopped at timing of the press operation of the stop buttons 27 to 29. The switch signal output from the stop button switch 67 based on press of each of the stop buttons 27 to 29 is utilized to the end only as a trigger when the symbols scrolled on the variable display portions are stopped and displayed.

Further, at the side plane (the right side plane in FIG. 1) of the cabinet 2, a start lever 17 is arranged rotatably within a predetermined angle range. To the start lever 17. a start switch 57 (mentioned hereinafter) is attached and when the start lever 17 is rotated a switch signal occurring from the start switch 57 is output to the CPU 50.

Figure 2:
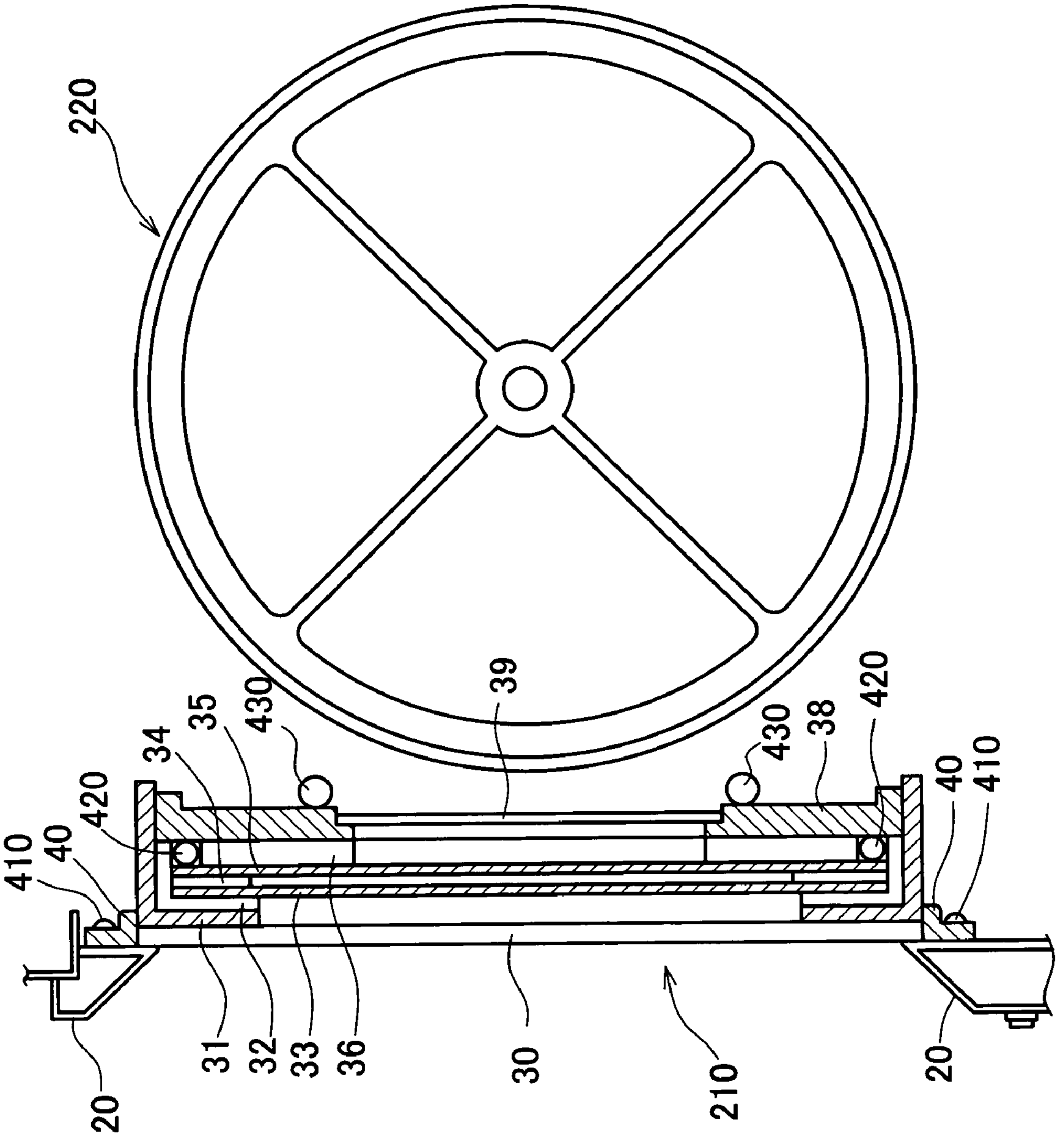
FIG. 2 is a longitudinal sectional view of a lower liquid crystal display and a reel.

Next, it will be described a detailed construction of the lower liquid crystal display 4 and reels rotatably arranged behind the lower liquid crystal display 4 in the cabinet 2, with reference to FIGS. 2 and 3. FIG. 2 is a longitudinal sectional view of the lower liquid crystal display and the reels, and FIG. 3 is an exploded perspective view of the lower liquid crystal display 4.

Figure 3:
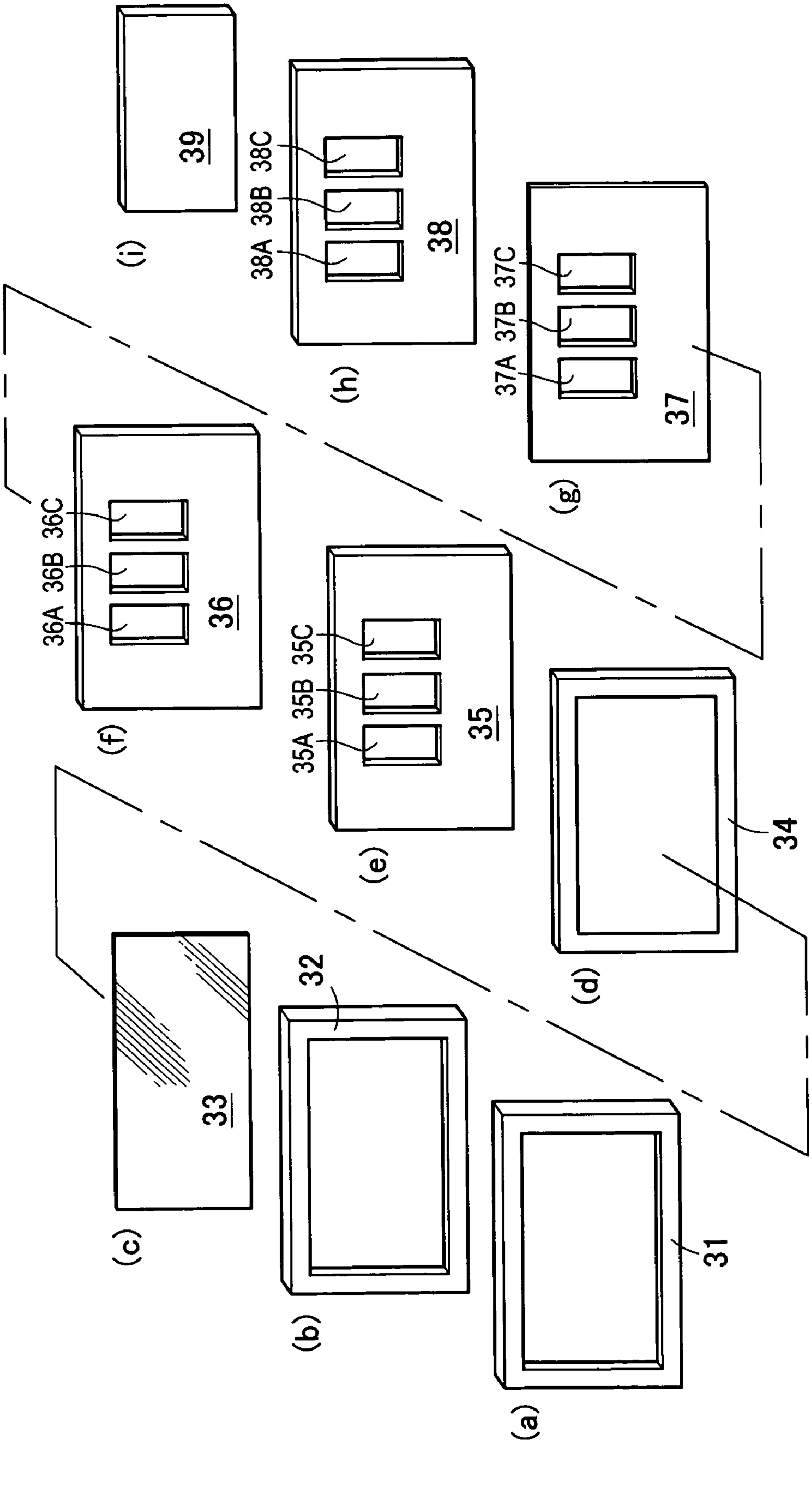
FIG. 3 is an exploded perspective view of the lower liquid crystal display.

In FIGS. 2 and 3, the lower liquid crystal display 4 is arranged within a display window 21 of a device front panel 20 positioned at the front center part of the cabinet 2 in the slot machine 1, with a touch panel 30 arranged at the front side (the left side in FIG. 2) of the lower liquid crystal display 4. And at the rear side (the right side in FIG. 2) of the lower liquid crystal display 4, three reels 220 (only one reel 220 is indicated in FIG. 2) are supported in a parallel state so that the reels 220 become independently rotatable.

That is to say, as shown in FIG. 2, the lower liquid crystal display 4 is arranged in front of three reels 220. And a base game mentioned later is conducted on the lower liquid crystal display 4 and a free game mentioned later is conducted on the reels 220.

Here, each reel 220 will be described. Among three reels 220, the left reel 220 when seen from the front plane of the slot machine 1 faces to a display portion 22 (see FIG. 1) formed in the lower liquid crystal display 4, the center reel 220 faces to a display portion 23 (see FIG. 1) similarly formed in the lower liquid crystal display 4 and the right reel 220 faces to a display portion 24 (see FIG. 1) similarly formed in the lower liquid crystal display 4.

Here, construction of each of the variable display portions 22 to 24 win be described hereinafter.

Figure 7:
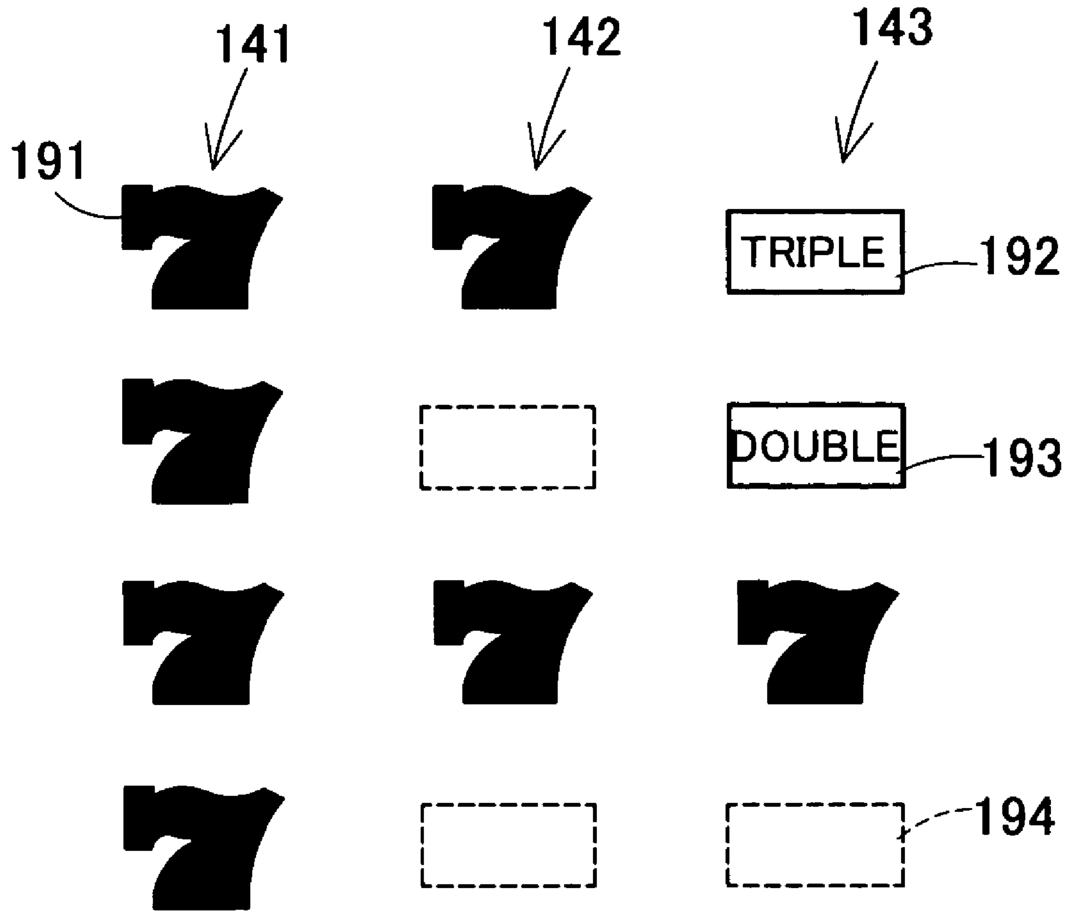
FIG. 7 is an explanatory view showing symbol rows formed on the reels, the symbol rows being utilized in a free game and seen and recognized through the variable display portions on the lower liquid crystal display.

Further, on an outer periphery of each reel 220, various kinds of symbols shown in FIG. 7 (three kinds of symbols are indicated in FIG. 7) are formed, such symbols being used in a free game explained hereinafter. Concretely, as kinds of symbols formed on the outer periphery of the reel 220, a seven symbol 191, a triple symbol 192 and a double symbol 193 are utilized. And these three kinds of symbols and blanks 194 (area that no symbol exists) are combined based on predetermined combinations and on an outer periphery of each reel 220, the combination of the symbols, in which the symbols and the blanks are totally combined (the total number of the symbols and the blanks is 12) is formed.

Here, various winning combinations are determined beforehand based on plural kinds of combinations of the symbols and when the symbol combination corresponding to the winning combination is stopped along a pay line L (see FIG. 1), coins are paid out from the coin payout chute 15 according to the winning combination. These points are as same as that in the conventional slot machine, therefore explanation thereof will be omitted. And formation of the symbols on the outer periphery of the reel 220 is generally done as follows. First, symbols and blanks (total number of which is 12) are printed on a long reel sheet having a width and a length corresponding to the width and the periphery length of the reel 220, respectively. And such reel sheet is adhered on the peripheral plane of the reel 220. Of course, the symbols may be formed by different method other than the above method.

Next, construction of the lower liquid crystal display 4 will be described with reference to FIGS. 2 and 3A~3I. In FIGS. 2 and 3A~3I, the lower liquid crystal display 4 is constructed by arranging from the front side of the slot machine 1; the transparent touch panel 30, the reel glass base 31, the bezel metal frame 32, the transparent liquid crystal panel 33, the liquid crystal holder 34, the diffusion sheet 35, the light guiding plate 36, the white reflector 37, the rear holder 38 and the antistatic sheet 39. In the diffusion sheet 35, three openings 35A, 35B, 35C are formed. Similarly, in the light guiding plate 36, the reflector 37 and the rear holder 38, three openings 36A, 36B, 36C, 37A, 37B, 37C, 38A, 38B, 38C are formed respectively, so as to coincide with the openings 35A, 35B, 35C. Here, the openings 35A~38A construct the variable display portion 22 (see FIG. 1) by superimposing so as to coincide with each other. Similarly, the openings 35B~38B construct the variable display portion 23 (see FIG. 1) by superimposing so as to coincide with each other and the openings 35C~38C construct the variable display portion 24 (see FIG. 1) by superimposing so as to coincide with each other.

Here, the openings 35A~35C of the diffusion sheet 35 and the openings 36A~36C of the light guiding plate 36 construct the light transmitting areas to retain visibility of the variable display portions 22 to 24.

In order to install the lower liquid crystal display 4 to the display window 210 of the device front panel 20, as shown in FIG. 2, brackets 40 are screwed to the rear side of the device front panel 20 by screws 410.

And at an upper and lower ends of the light guiding plate 36, a pair of cathode ray tubes 420 are arranged as light source of the liquid crystal panel 33. And at an upper and lower positions in the rear side of each of openings 38A~38C in the holder 38, a pair of cold cathode ray tubes 430 may be arranged.

The liquid crystal panel 33 is a transparent electric display panel on which transparent electrodes such as Ito are formed, and the circumference in rear side of the display portion of the liquid crystal panel 33 is held by the liquid crystal holder 34. The light guiding plate 36 is made of the light transmitting resin panel, and in the light guiding plate 36 lens cut portions are formed, the lens cut portions guiding light emitted from the cathode ray tubes 420 positioned at side positions to the rear side of the liquid crystal panel 33. The light diffusion sheet 35 is made from a light transmitting resin sheet and diffuses light led thereto by the light guiding plate 36 and levels light irradiated to the liquid crystal panel 33. The liquid crystal holder 34 for holding the liquid crystal panel 33, the diffusion sheet 35 and the light guiding plate 36 are assembled into one-piece construction and circumference thereof is inserted in the bezel metal frame 32. Thereby, the front side of the display portion in the liquid crystal panel 33 is retained by the bezel metal frame 32.

Circumferences of the liquid crystal holder 34, the light diffusion sheet 35 and the light guiding plate 36, which are inserted in the bezel metal frame 32 and assembled into one-piece construction, is further inserted in the reel glass base 31 and retained by the reel glass base 31 in a state that the front display plane of the liquid crystal panel 33 is opened. The transparent touch panel 30 is pressed to the front face of the reel glass base 31 and superimposed on the front face of display portion of the liquid crystal panel 33 based on that the reel glass base 31 is attached to the device front panel 20 by screws 410.

The rear holder 38 is made from a white resin plate and retains to the reel glass base 31 the bezel metal frame 32 supported to the reel glass base 31, the liquid crystal holder 34 holding the liquid crystal panel 33, the light diffusion sheet 35 and the light guiding plate 36 from the rear sides thereof. The rear holder 38 also functions as a reflecting plate for reflecting light emitted from the cathode ray tubes 420 to the light guiding plate 36 toward the liquid crystal panel 33. The antistatic sheet 39 is made transparent and adhered to the rear plane of the rear holder 38 by double-sided adhesive tape, thereby the antistatic sheet 39 covers the rear plane of each of the openings 38A~38C formed in the rear holder 38.

Figure 6:
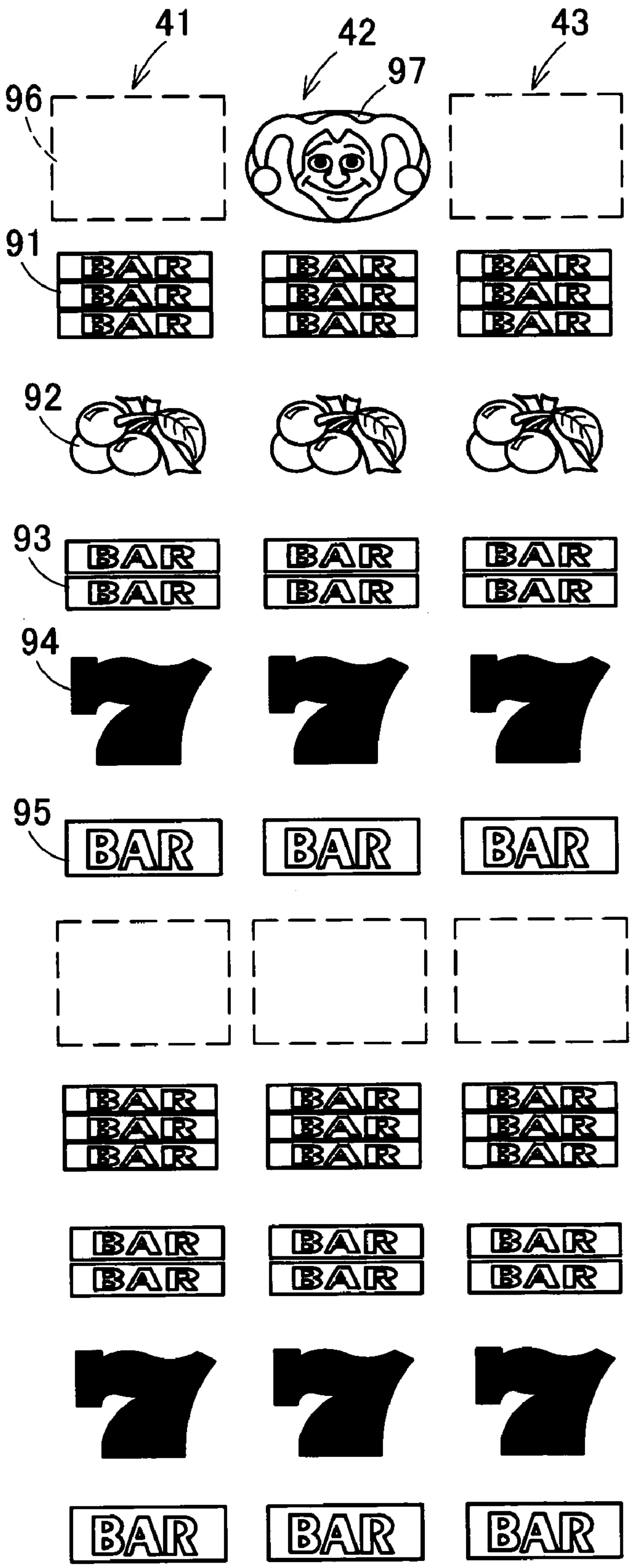
FIG. 6 is an explanatory view showing symbol rows variably displayed on variable display portions which are displayed on the lower liquid crystal display when a base game is conducted.

Next, according to FIG. 6, it will be described symbol rows which are variably displayed on the variable display portions 22 to 24 of the lower liquid crystal display 4 while scrolling thereon, the symbol rows being displayed on the lower liquid crystal display 4 in the base game. In FIG. 6, the symbol row 41 is the symbol row which is variably displayed on the variable display portion 22, the symbol row 42 is the symbol row which is variably displayed on the variable display portion 23, the symbol row 43 is the symbol row which is variably displayed on the variable display portion 24.

Here, the symbol rows 41 and 43 commonly have the same arrangement of the symbols and such arrangement of the symbols is constructed from eleven symbols in which the triple BAR 91, the cherry 92, the double BAR 93, the symbol seven 94, the single BAR 95 and the blank (no symbol exists) 96 are voluntarily combined.

And although the symbol row 42 is as same as the symbol row 41 and 43 at the point that the triple BAR 91, the cherry 92, the double BAR 93, the symbol seven 94, the single Bar 95 and the blank 96 are combined, one joker 97 as the trigger symbol is further arranged in the symbol row 42. This trigger symbol 97, as mentioned hereinafter, functions as a symbol to shift to the free game in the base game, and when the trigger symbol 97 is stopped and displayed on the pay line L in the variable display portion 23, the game condition shifts to the free game from the base game.

Here, when the symbol rows 41 to 43, which are scrolled on the variable display portions 22 to 24 respectively, are stopped and displayed thereon, three symbols are stopped and displayed on each variable display portion.

And various winning combinations are set beforehand based on a plurality of symbol combinations and when the symbol combination corresponding to the winning combination is stopped on the pay line L, coins are paid out from the coin payout chute 15 according to the winning combination. The above mentioned points are as same as those in the conventional slot machine, therefore detailed description thereof will be omitted.

Next, it will be described a construction of the control system in the slot machine 1 with reference to FIG. 4. FIG. 4 is a block diagram schematically showing the control system in the slot machine 1.

In FIG. 4, the control system of the slot machine 1 is basically constructed from the CPU 50, and a ROM 51 and a RAM 52 are connected to the CPU 50. The ROM 51 stores a main process program mentioned later, a base game process program, a free game process program, various effect programs for executing various effects on the upper liquid crystal display 3 and the lower liquid crystal display 4 according to progress in games, a lottery table utilized in lottery of the symbols stopped and displayed in the base game, a lottery table utilized in lottery of the symbols stopped and displayed in the free game, various programs necessary for controlling the slot machine 1 and various data tables and the like. And the RAM 52 is a memory for temporarily storing various data calculated by the CPU 50.

And to the CPU 50, a clock pulse generator 53 for generating standard clock pulses and a frequency divider 54 are connected, and a random number generator 55 and a sampling circuit 56 are also connected. Random number sampled by the random number generator 56 is utilized in various lotteries of the winning combinations, the effects and the like. Further, to the CPU 50, the start switch 57 attached to the start lever 17, the spin switch 58 attached to the SPIN/REPEAT BET button 12, the 1-BET switch 59 attached to the 1-BET button 11, the 3-BET switch 60 attached to the 3-BET button 13, the 5-BET switch 61 attached to the 5-BET button 14, the change switch 62 attached to the change button 6, the payout switch 63 attached to the payout button 7 and the help switch 64 attached to the help button 8 are connected respectively. The CPU 50 controls the slot machine 1 to execute various operations corresponding to each button, based on the switch signal output from each switch when such buttons are pressed.

To the CPU 50, three stepping motors 68 for rotating each of the reels 220 through a motor drive circuit 167 are connected, and also a reel position detection circuit 69 is connected. When a motor drive signal is output to the motor drive circuit 167, each stepping motor 68 is driven to rotate by the motor drive circuit 167, thereby each reel 220 is rotated.

At that time, after each reel 22 is started to rotate, the number of drive pulses provided to each stepping motor 68 is calculated and the calculated value is written in the predetermined area of the RAM 52. And the reset pulse is output every one rotation of the reel 220 and such reset pulse is input to the CPU 50 through the reel position detection circuit 69. When the reset pulse is input to the CPU 50, the calculated value written in the RAM 52 is cleared in "0", and the CPU 50 recognizes the symbol rotational position in the reel 220, based on the calculated value corresponding to the rotational position of the reel 220 within one rotation and the symbol table in which the rotational position of the reel 22 stored in the ROM 51 and the symbols formed on outer peripheral plane of the reel 22 are corresponded with each other.

Further, to the CPU 50, the coin sensor 65 positioned in the coin insertion slot 9 and the bill sensor 66 positioned in the bill insertion portion 10 are connected respectively. The coin sensor 65 detects coins inserted from the coin insertion slot 9 and the CPU 50 calculates the number of inserted coins based on the coin detection signal output from the coin sensor 65. The bill sensor 66 detects the kind and sum of bill and the CPU 50 calculates the number of coins equivalent to sum of bill, based on the bill detection signal output from the bill sensor 66. And to the CPU 50, the stop button switches 67 attached to the stop buttons 27 to 29 are connected. When press operation of the stop buttons 27 to 29 is conducted, switch signals are output from the stop button switches 67 and the CPU 50 stops and displays the symbols which are scrolled on the variable display portions 22 to 24, based on switch signals.

To the CPU 50, a hopper 71 is connected through a hopper drive circuit 70. When a drive signal is output to the hopper circuit 70 from the CPU 50, the hopper 71 pays out predetermined number of coins from the coin payout chute 15

And to the CPU 50, a coin detection part 73 is connected through a payout completion signal circuit 72. The coin detection part 73 is arranged in the coin payout chute 15 and when the coin detection part 73 detects that a predetermined number of coins are paid out from the coin payout chute 15, the payout completion signal is output to the payout completion signal circuit 72 from the coin detection part 73. Based on this, the payout completion signal circuit 72 outputs the payout completion signal to the CPU 50. Further, to the CPU 50, the upper liquid crystal display 3 is connected through a liquid crystal drive circuit 74 and the lower liquid crystal display 4 is connected through a liquid crystal drive circuit 75. The upper liquid crystal display 3 and the lower liquid crystal display 4 are controlled by the CPU 50.

Figure 5:
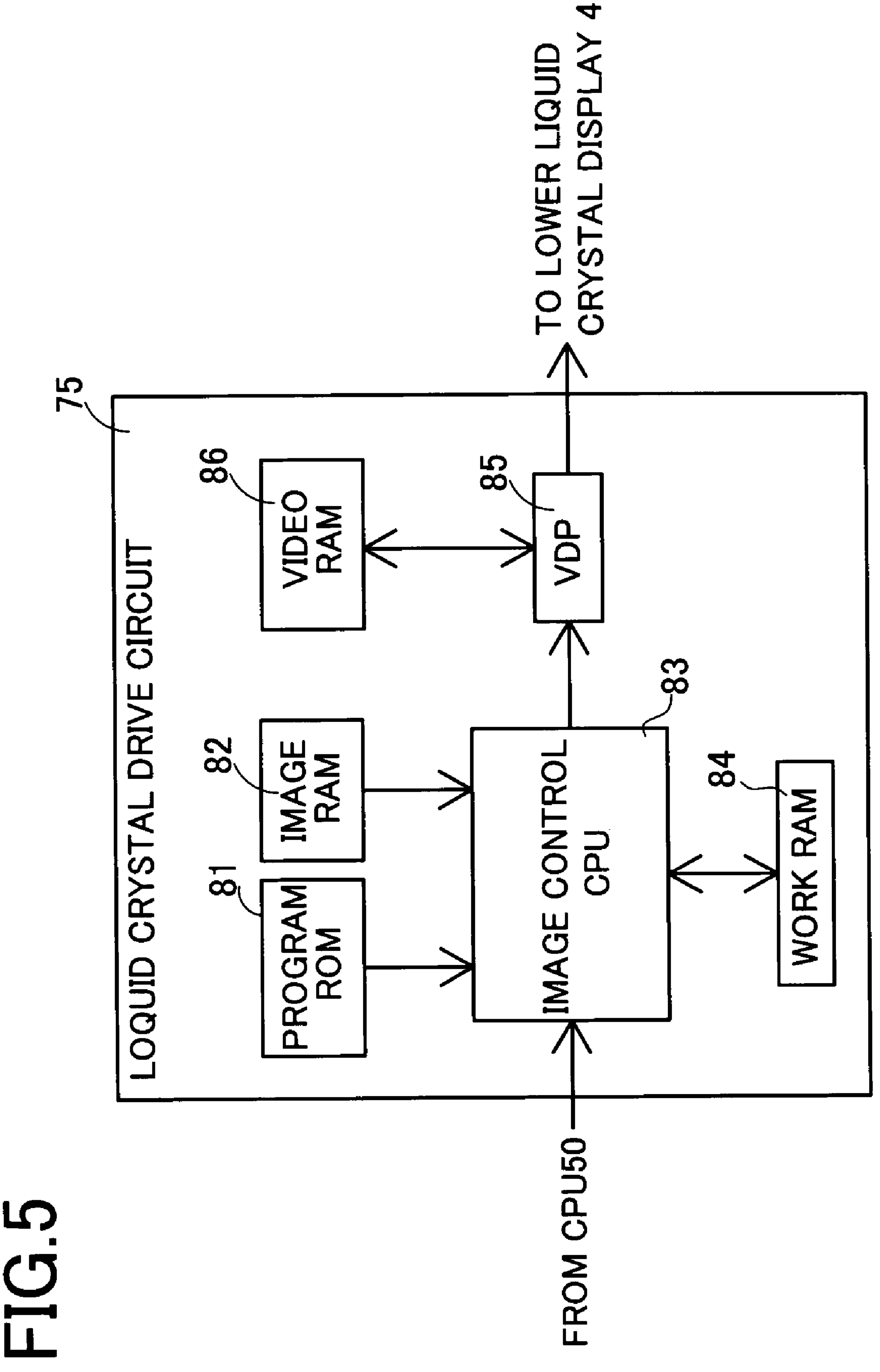
FIG. 5 is a block diagram schematically showing a liquid crystal drive circuit of the lower liquid crystal display.

At this point of view, as shown in FIG. 5, the liquid crystal drive circuit 74 is constructed from a program ROM 81, an image ROM 82, an image control CPU 83, a work RAM 84, a VDP (Video Display Processor) 85 and a video RAM 86. And in the program ROM 81, an image control program concerning with display on the lower liquid crystal display 4 and various selection tables are stored. Further, in the image ROM 82, for example, it is stored dot data for forming images such as the symbol rows 41~43 in FIG. 6 displayed on the lower liquid crystal display 4 (or variable display portions 22 to 24). And the image control CPU 83 determines images displayed on the lower liquid crystal display 4 among the dot data stored in the image ROM 82 beforehand, according to the image control program stored in the program ROM 81 based on parameters set by the CPU 50. And the work RAM 84 functions as the temporary memory when the above image control program is executed by the image control CPU 83. Further, the VDP 85 forms images corresponding to display contents determined by the image control CPU 83 and outputs the images to the lower liquid crystal display 4. Thereby, for example, the symbol rows 41~43 of FIG. 6 are scrolled and displayed on the lower liquid crystal display 4 (or variable display portions 22 to 24). Here, the video RAM 86 functions as the temporary memory when images are formed by the VDP 85.

And to the CPU 50, LEDs 78 are connected through a LED drive circuit 77. A plurality of LEDs 78 are arranged on the front plane of the slot machine 1 and the LEDs 78 are controlled so as to turn on based on the drive signals from the CPU 50. Further, a speaker 80 and a sound output circuit 79 are connected to the CPU 50 and the speaker 80 produces various effective sounds when various effects are conducted based on the output signal from the sound output circuit 79.

Here, in a case that the base games are conducted in the slot machine 1 by utilizing three variable display portions 22 to 24, the lottery table utilized when the symbols stopped and displayed on the pay line L are determined will be described with reference to FIG. 8. FIG. 8 is an explanatory view showing the lottery table based on which the symbols to be stopped and displayed on three variable display portions 22 to 24 are determined when the base game is conducted while utilizing three variable display portions 22 to 24.

The symbols stopped and displayed on the pay line L are determined every the variable display portion 22 to 24. In order to realize this, one of the code numbers "0"~"10" is allotted to each symbol in the symbol rows 41 to 43 shown in FIG. 6 which are displayed on the variable display portions 22 to 24, respectively, and it is provided the lottery table shown in FIG. 8. Further, three random number values are sampled corresponding to each of the variable display portions 22 to 24, through the random number sampling circuit 56.

Here, in FIG. 8, for explanatory convenience, the symbol row 41 of the left variable display portion 22 is indicated as the "left reel", the symbol row 43 of the right variable display portion 24 is indicated as the "right" reel and the symbol row 42 of the center variable display portion 23 is indicated as the "center reel".

As for the "left reel" corresponding to the symbol row 41 of the left variable display portion 22, if the random number value sampled by the random number sampling circuit 56 lies in a range of 0~15, the blank 96 allotted to the code number "0" is stopped and displayed on the pay line L. And if the random number value lies in a range of 16~25, the triple BAR 91 allotted to the code number "1" is stopped and displayed on the pay line L, and if the random number value lies in a range of 26~36, the cherry 92 allotted to the code number "2" is stopped and displayed on the pay line L. If the random number value lies in a range of 37~46, the double BAR 93 allotted to the code number "3" is stopped and displayed on the pay line L, and if the random number value lies in a range of 47~52, the symbol seven 94 allotted to the code number "4" is stopped and displayed on the pay line L. If the random number value lies in a range of 53~63, the single BAR 95 allotted to the code number "5" is stopped and displayed on the pay line L, and if the random number value lies in range of 64~80, the blank 96 allotted to the code number "6" is stopped and displayed on the pay line L. If the random number value lies in a range of 81~91, the triple BAR allotted to the code number "7" is stopped and displayed on the pay line L, and if the random number value lies in a range of 92~103, the double BAR 93 allotted to the code number "8" is stopped and displayed on the pay line L. If the random number value lies in a range of 104~115, the symbol seven 94 allotted to the code number "9" is stopped and displayed on the pay line L, and if the random number value lies in a range of 116~127, the single BAR 95 allotted to the code number "10" is stopped and displayed on the pay line L.

And as for the "right reel" corresponding to the symbol row 43 of the right variable display portion 24, there is the same relation as that in the above left reel. And if the random number value sampled by the random number sampling circuit 56 lies in a range of 0~15, the blank 96 allotted to the code number "0" is stopped and displayed on the pay line L. And if the random number value lies in a range of 16~25, the triple BAR 91 allotted to the code number "1" is stopped and displayed on the pay line L, and if the random number value lies in a range of 26~36, the cherry 92 allotted to the code number "2" is stopped and displayed on the pay line L. If the random number value lies in a range of 37~46, the double BAR 93 allotted to the code number "3" is stopped and displayed on the pay line L, and if the random number value lies in a range of 47~52, the symbol seven 94 allotted to the code number "4" is stopped and displayed on the pay line L. If the random number value lies in a range of 53~63, the single BAR 95 allotted to the code number "5" is stopped and displayed on the pay line L, and if the random number value lies in range of 64~80, the blank 96 allotted to the code number "6" is stopped and displayed on the pay line L. If the random number value lies in a range of 81~91, the triple BAR allotted to the code number "7" is stopped and displayed on the pay line L, and if the random number value lies in a range of 92~103, the double BAR 93 allotted to the code number "8" is stopped and displayed on the pay line L. If the random number value lies in a range of 104~115, the symbol seven 94 allotted to the code number "9" is stopped and displayed on the pay line L, and if the random number value lies in a range of 116~127, the single BAR 95 allotted to the code number "10" is stopped and displayed on the pay line L.

On the other hand, as for the "center reel" corresponding to corresponding to the symbol row 42 of the center variable display portion 23, if the random number value sampled by the random number sampling circuit 56 is 0 (zero), the trigger symbol 97 allotted to the code number "0" is stopped and displayed on the pay line L. And if the random number value lies in a range of 1~15, the triple BAR 91 allotted to the code number "1" is stopped and displayed on the pay line L, and if the random number value lies in a range of 16~20, the cherry 92 allotted to the code number "2" is stopped and displayed on the pay line L. And if the random number value lies in a range of 21~32, the double BAR 93 allotted to the code number "3" is stopped and displayed on the pay line L, and if the random number value lies in a range of 33~45, the symbol seven 94 allotted to the code number "4" is stopped and displayed on the pay line L. And if the random number value lies in a range of 46~53, the single BAR 95 allotted to the code number "5" is stopped and displayed on the pay line L, and if the random number value lies in a range of 54~64, the blank 96 allotted to the code number "6" is stopped and displayed on the pay line L. And if the random number value lies in a range of 65~71, the triple BAR 91 allotted to the code number "7" is stopped and displayed on the pay line L, and if the random number value lies in a range of 72~82, the double BAR 93 allotted to the code number "8" is stopped and displayed on the pay line L. And the random number value lies in a range of 83~120, the symbol seven 94 allotted to the code number "9" is stopped and displayed on the pay line L, and if the random number value lies in a range of 121~127, the single BAR 95 allotted to the code number "10" is stopped and displayed on the pay line L.

Next, in a case that the base game is conducted by utilizing three variable display portions 22 to 24 in the slot machine 1, the winning combinations and payouts will be described with reference to FIG. 9. FIG. 9 is an explanatory view showing correspondence between winning combinations and payouts when the base game is conducted while utilizing three variable display portions. In FIG. 9, in a case that the code number of the center reel is "0" (zero) and the code numbers of the right reel and the left reel is any of "1" to "10", the trigger symbol (joker) 97 is won. In this case, the trigger symbol 07 is stopped and displayed on the pay line L in the variable display portion 23 and the payout thereof is the trigger for the free game, thereby game condition shifts to the free game from the base game. Here, the free game is the game which is conducted after the base game is finished and the free game is generally made beneficial for the player in many cases. For example, when game condition shifts to the free game, the player can continuously enjoy 10 games, 20 games or 30 games according to the rank of the free game, without betting coins. At that time, in the free game, winning probability of various winning combinations is generally set high, therefore the player can get many coins in many cases. This contents of the free game will be described hereinafter.

And if the code numbers of the right reel, the center reel and the left reel are "4" or "9", the winning combination "7-7-7" is won. In this case, the symbol seven 94 is stopped and displayed on the pay line L in each of the variable display portions 22, 23 and 24, and the payout thereof is 100 coins. And if the code numbers of the right reel, the center reel and the left reel are "1" or "7", the winning combination "3BAR-3BAR-3BAR" is won. In this case, the 3 BAR 91 is stopped and displayed on the pay line L in each of the variable display portions 22, 23 and 24, and the payout thereof is 5 coins. And if the code numbers of the right reel, the center reel and the left reel are "3" or "8", the winning combination "2BAR-2BAR-2BAR" is won. In this case, the 2 BAR 93 is stopped and displayed on the pay line L in each of the variable display portions 22, 23 and 24, and the payout thereof is 3 coins. And if the code numbers of the right reel, the center reel and the left reel are "5" or "10", the winning combination "1 BAR-1BAR-1BAR" is won. In this case, the 1 BAR 95 is stopped and displayed on the pay line L in each of the variable display portions 22, 23 and 24, and the payout thereof is 2 coins. And if the code numbers of the right reel, the center reel and the left reel are "2", the winning combination "cherry-cherry-cherry" is won. In this case, the cherry 92 is stopped and displayed on the pay line L in each of the variable display portions 22, 23 and 24, and the payout thereof is 1 coin.

Here, if the combination of the code numbers in the right reel, the center reel and the left reel is a combination other than the above combinations, the winning combination is lost. In this case, any one of the triple BAR 91, the cherry 92, the double BAR 93, the symbol seven 94, the single BAR 95 and the blank 96, each of which corresponds to each code number is stopped and displayed on the pay line L in each of the variable display portions 22, 23 and 24, and the payout thereof is nothing.

In addition to the above, in a case that the free game is conducted in the slot machine 1, the lottery table utilized to determine the symbols stopped on the pay line L will be described with reference to FIG. 10. Here, in the free game, three variable display portions 22 to 24, through which the symbol on each of three reels 220 can be seen, are utilized. FIG. 10 is an explanatory view showing lottery tables based on which the symbols stopped and displayed on the reels, the symbols being seen and recognized through the variable display portions, are determined when the free game is conducted while utilizing three variable display portions and reels.

The symbol stopped and displayed on the pay line L is determined every each of three reels 220. In order to realize this, one of the code numbers "0"~"3" is allotted to each symbol in the symbol rows 141 to 143 shown in FIG. 7 which are formed on each of three reels 220, respectively, and it is provided the lottery table shown in FIG. 10. Further, three random number values are sampled corresponding to each of three reels 220, through the random number sampling circuit 56.

Here, in FIG. 10, for explanatory convenience, the reel 220, on which the symbol row 141 is formed, the symbol row 141 being seen and recognized through the left variable display portion 22, is indicated as the “left reel”, the reel 220, on which the symbol row 143 is formed, the symbol row 143 being seen and recognized through the right variable display portion 24, is indicated as the “right reel” and the reel 220, on which the symbol row 142 is formed, the symbol row 412 being seen and recognized through the center variable display portion 23, is indicated as the “center reel”.

As for the “left reel” on which the symbol row 141 is formed, if the random number value sampled by the random number sampling circuit 56 lies in a range of 0~31, the seven symbol 191 allotted to the code number “0” is stopped and displayed on the pay line L. And if the random number value lies in a range of 32~63, the seven symbol 191 allotted to the code number “1” is stopped and displayed on the pay line L, and if the random number value lies in a range of 64~95, the seven symbol 191 allotted to the code number “2” is stopped and displayed on the pay line L. If the random number value lies in a range of 96~127, the seven symbol 191 allotted to the code number “3” is stopped and displayed on the pay line L.

And as for the center reel on which the symbol row 142 is formed, if the random number value sampled by the random number sampling circuit 56 lies in a range of 0~15, the seven symbol 191 allotted to the code number “0” is stopped and displayed on the pay line L. And if the random number value lies in a range of 16~63, the blank 194 allotted to the code number “1” is stopped and displayed on the pay line L, and if the random number value lies in a range of 64~79, the seven symbol 191 allotted to the code number “2” is stopped and displayed on the pay line L. If the random number value lies in a range of 80~127, the blank 194 allotted to the code number “3” is stopped and displayed on the pay line L.

And as for the right reel on which the symbol row 143 is formed, if the random number value sampled by the random number sampling circuit 56 lies in a range of 0~12, the triple symbol 192 allotted to the code number “0” is stopped and displayed on the pay line L. And if the random number value lies in a range of 13~47, the double symbol 193 allotted to the code number “1” is stopped and displayed on the pay line L, and if the random number value lies in a range of 48~85, the seven symbol 191 allotted to the code number “2” is stopped and displayed on the pay line L. If the random number value lies in a range of 86~127, the blank 194 allotted to the code number “3” is stopped and displayed on the pay line L.

Next, the winning combinations and the payouts utilized when the free game is conducted while utilizing three variable display portions and reels will be described with reference to FIG. 11. FIG. 11 is an explanatory view showing correspondence between winning combinations and payouts when the free game is conducted while utilizing three variable display portions and reels. In FIG. 11, if the code number of the right reel is any one of “0”~“3” and the code number of the center reel is “0” or “2” and the code number of the left reel is “0”, the winning combination “7-7-Tr” is won. In this case, the seven symbol 191, the seven symbol 191 and the triple symbol 192 are stopped and displayed on the pay line L through the variable display portions 22 to 24, and the payout thereof is 300 coins. And if the code numbers of the right reel any one of “0”~“3” and the code number of the center reel is “0” or “2” and the code number of the left reel is “1”, the winning combination “7-7-Do” is won. In this case, the seven symbol 191, the seven symbol 191 and the double symbol 193 are stopped and displayed on the pay line L through the variable display portions 22 to 24, and the payout thereof is 200 coins. And if the code number of the right reel is any one of “0”~“3” and the code number of the center reel is “0” or “2” and the code number of the left reel is “2”, the winning combination “7-7-7” is won. In this case, the seven symbol 191, the seven symbol 191 and the seven symbol 191 are stopped and displayed on the pay line L through the variable display portions 22 to 24, and the payout thereof is 100 coins.

Here, if the combination of the code numbers in the right reel, the center reel and the left reel is a combination other than the above combinations, the winning combination is lost. In this case, any one of the seven symbol 191, the triple symbol 192, the double symbol 193 and the blank 194, each of which corresponds to each code number is stopped and displayed on the pay line L in each reel through the variable display portions 22 to 24, and the payout thereof is nothing.

Here, the payout expectation values in both the base game and the free game will be described with reference to FIGS. 12 and 13. As mentioned in the above, there exist many chances to get many coins in the free game in comparison with the base game. This fact can be explained based on the payout expectation values. FIG. 12 is an explanatory view showing payout expectation values in the base game, and FIG. 13 is an explanatory view showing payout expectation values in the free game.

In the base game conducted in the embodiment, although the lottery tables shown in FIG. 8 is provided corresponding to the code numbers “0”-“10”, the range of the random number utilized in the lottery tables is set 0~10 in FIG. 12, in order to simplify calculation of the payout expectation values, and one random number is allotted to each of the code numbers “0”~“10” (see the table shown in FIG. 12 A). As a result, as shown in the table of FIG. 12B, the winning probability becomes 0.60% in all of the winning combination “7-7-7” with the payout of 100 coins, the winning combination “3BAR-3BAR-3BAR” with the payout of 5 coins, the winning combination “2BAR-2BAR-2BAR” with the payout of 3 coins and the winning combination “BAR-BAR-BAR” with the payout of 2 coins. On the other hand, the winning probability becomes 0.08% in the winning combination “cherry-cherry-cherry” with the payout of one coin.

Therefore, the payout expectation value after 10 base games are conducted becomes 6 in the winning combination “7-7-7” with the payout of 100 coins and becomes 0.30 in the winning combination “3BAR-3BAR-3BAR” with the payout of 5 coins. And such payout expectation value becomes 0.18 in the winning combination “2BAR-2BAR-2BAR” with the payout of 3 coins and becomes 0.12 in the winning combination “BAR-BAR-BAR” with the payout of 2 coins. Similarly, such payout expectation value becomes 0.01 in the winning combination “cherry-cherry-cherry” with the payout of one coin. The total value becomes 6.61. Further, the payout expectation value after 20 base games are conducted becomes 12 in the winning combination “7-7-7” with the payout of 100 coins and becomes 0.60 in the winning combination “3BAR-3BAR-3BAR” with the payout of 5 coins. And such payout expectation value becomes 0.36 in the winning combination “2BAR-2BAR-2BAR” with the payout of 3 coins and becomes 0.24 in the winning combination “BAR-BAR-BAR” with the payout of 2 coins. Similarly, such payout expectation value becomes 0.02 in the winning combination “cherry-cherry-cherry” with the payout of one coin. The total value becomes 13.22. And the payout expectation value after 30 base games are conducted becomes 18 in the winning combination “7-7-7” with the payout of 100 coins and becomes 1.80 in the winning combination “3BAR-3BAR-3BAR” with the payout of 5 coins. And such payout expectation value becomes 0.54 in the winning combination “2BAR-2BAR-2BAR” with the payout of 3 coins and becomes 0.36 in the winning combination “BAR-BAR-BAR” with the payout of 2 coins. Similarly, such payout expectation value becomes 0.02 in the winning combination "cherry-cherry-cherry" with the payout of one coin. The total value becomes 20.72.

And in the free game conducted in the embodiment, although the lottery tables shown in FIG. 10 is provided corresponding to the code numbers "0"~"3", the range of the random number utilized in the lottery tables is set 0~3 in FIG. 13, in order to simplify calculation of the payout expectation values, and one random number is allotted to each of the code numbers "0"~"3" (see the table shown in FIG. 13A). As a result, as shown in the table of FIG. 13B, the winning probability becomes 9.38% in all of the winning combination "7-7-Tr" with the payout of 300 coins, the winning combination "7-7-Do" with the payout of 200 coins, the winning combination "7-7-7" with the payout of 100 coins.

Therefore, the payout expectation value after 10 free games are conducted becomes 281.3 in the winning combination "7-7-Tr" with the payout of 300 coins and becomes 187.5 in the winning combination "7-7-Do" with the payout of 200 coins. And such payout expectation value becomes 93.8 in the winning combination "7-7-7" with the payout of 100 coins. The total value becomes 562.5. Further, the payout expectation value after 20 free games are conducted becomes 562.5 in the winning combination "7-7-Tr" with the payout of 300 coins and becomes 375.0 in the winning combination "7-7-Do" with the payout of 200 coins. And such payout expectation value becomes 187.5 in the winning combination "7-7-7" with the payout of 100 coins. The total value becomes 1125. And the payout expectation value after 30 free games are conducted becomes 843.8 in the winning combination "7-7-Tr" with the payout of 300 coins and becomes 562.5 in the winning combination "7-7-Do" with the payout of 200 coins. And such payout expectation value becomes 281.3 in the winning combination "7-7-7" with the payout of 100 coins. The total value becomes 1687.5.

As mentioned above, the payout expectation value in the free game is made substantially 85 times as large in comparison with that in the base game, in all cases of 10 games, 20 games and 30 games. Thus, there exist many cases to be able to obtain many coins in the free game than in the base game, as a result, the free game is more beneficial for the player than the base game.

Figure 14:
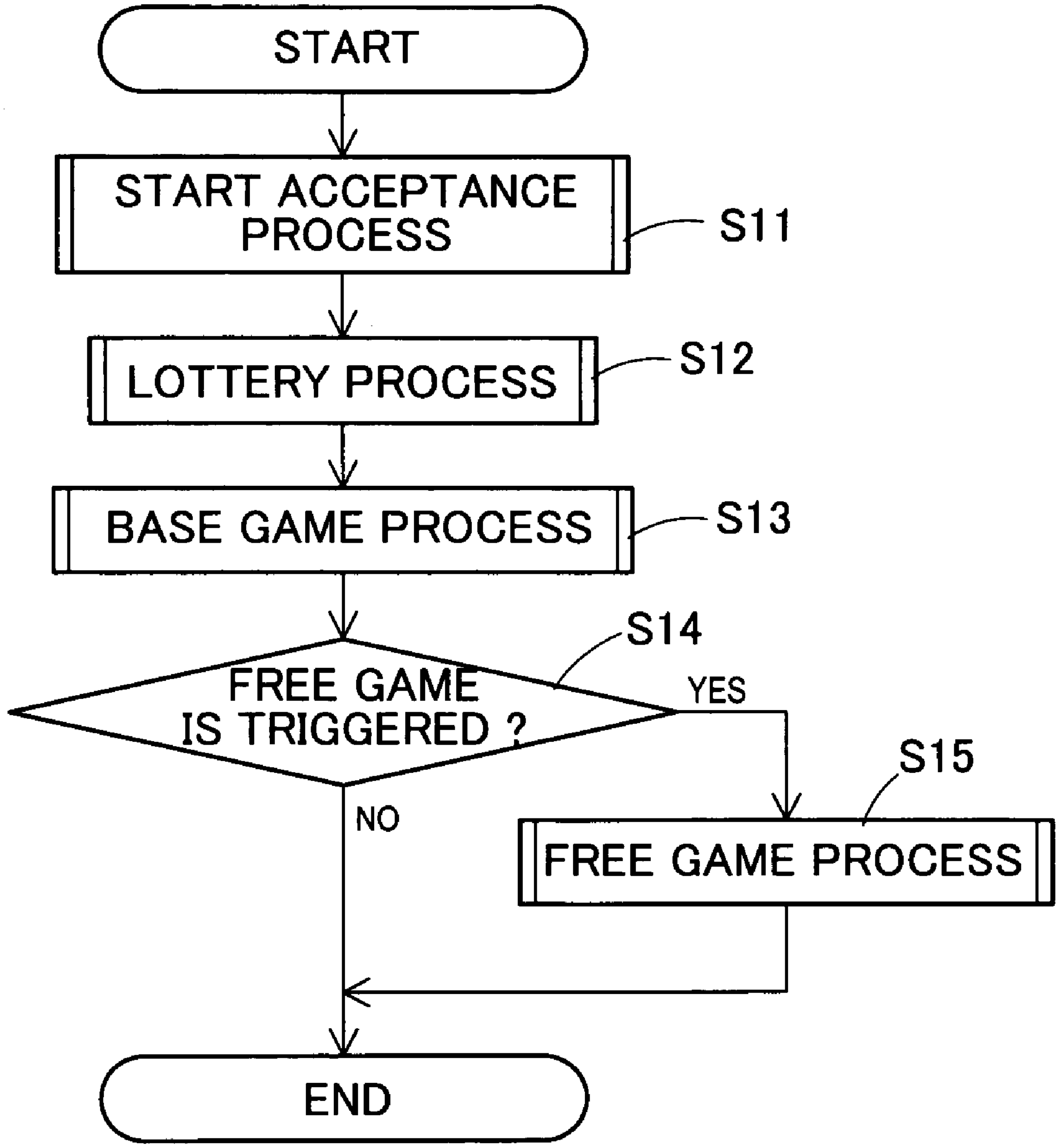
FIG. 14 is a flowchart showing a main process program.

In addition to the above, the main process program executed in the slot machine 1 will be described with reference to FIG. 14. FIG. 14 is a flowchart of the main process program. In FIG. 14, at first, in step (abbreviated as "S" hereinafter) 11, start acceptance process in FIG. 15 mentioned later is done. This start acceptance process is the process to accept the switch signal output from the start switch 57, the spin switch 58, the 1-BET switch 59, the 3-BET switch 60 or the 5-BET switch 61, based on operation of the start lever 17, the SPIN/REPEAT BET button 12, the 1-BET button 11, the 3-BET button or the 5-BET button 14. At the time that the switch signal output from each switch is accepted, the game is started.

Figure 16:
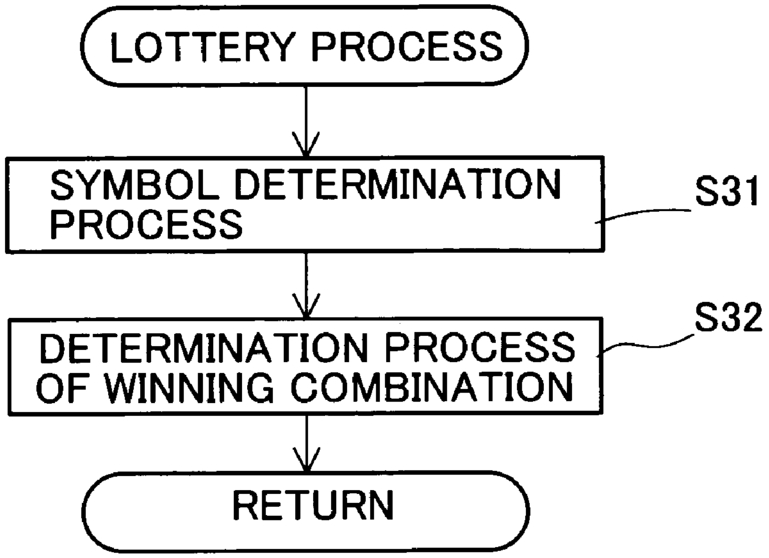
FIG. 16 is a flowchart showing a lottery process program.

And in S12, the lottery process in FIG. 16 mentioned later is done based on the switch signal output from the start switch 57, the spin switch 58, the 1-BET switch 59, the 3-BET switch 60 or the 5-BET switch 61.

Here, if the trigger symbol (joker) is won and the free game is triggered, the number of times that the free games are continuously executed is determined, and such number of times is selected, for example, among 10 games, 20 games and 30 games by the lottery.

Figure 17:
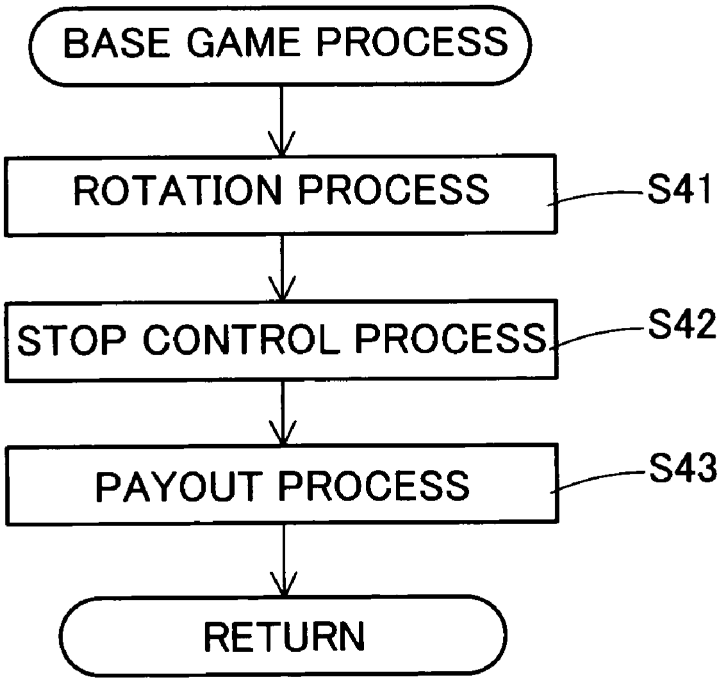
FIG. 17 is a flowchart showing a base game process program.
Figure 18:
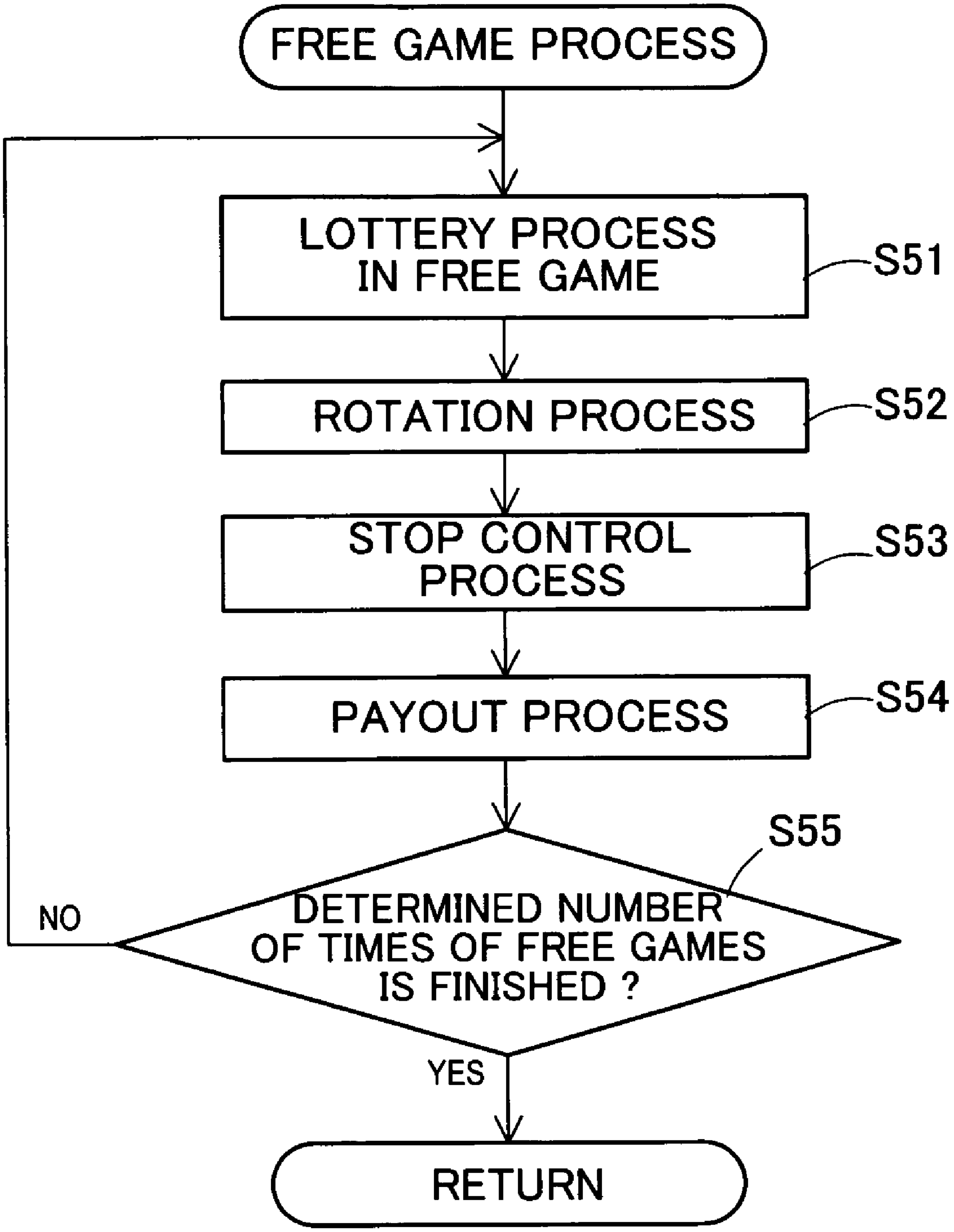
FIG. 18 is a flowchart showing a free game process program.

In S13, the base game process shown in FIG. 17 is done. Thereafter, procedure shifts to S14 and it is determined whether the trigger of the free game is realized or not. Concretely speaking, in the lottery process in S12, if the random number value of the center reel sampled by the random number sampling circuit 56 is 0 (zero), the free game is triggered (S14: YES), therefore procedure shifts to S15 and the free game process in FIG. 18 is done, thereafter the main process program is finished. On the other hand, if the random number value of the center reel sampled by the random number sampling circuit 56 in the lottery process in S12 lies in a range of 1~127, the free game is not triggered (S14: NO), therefore the main process program is finished.

Figure 15:
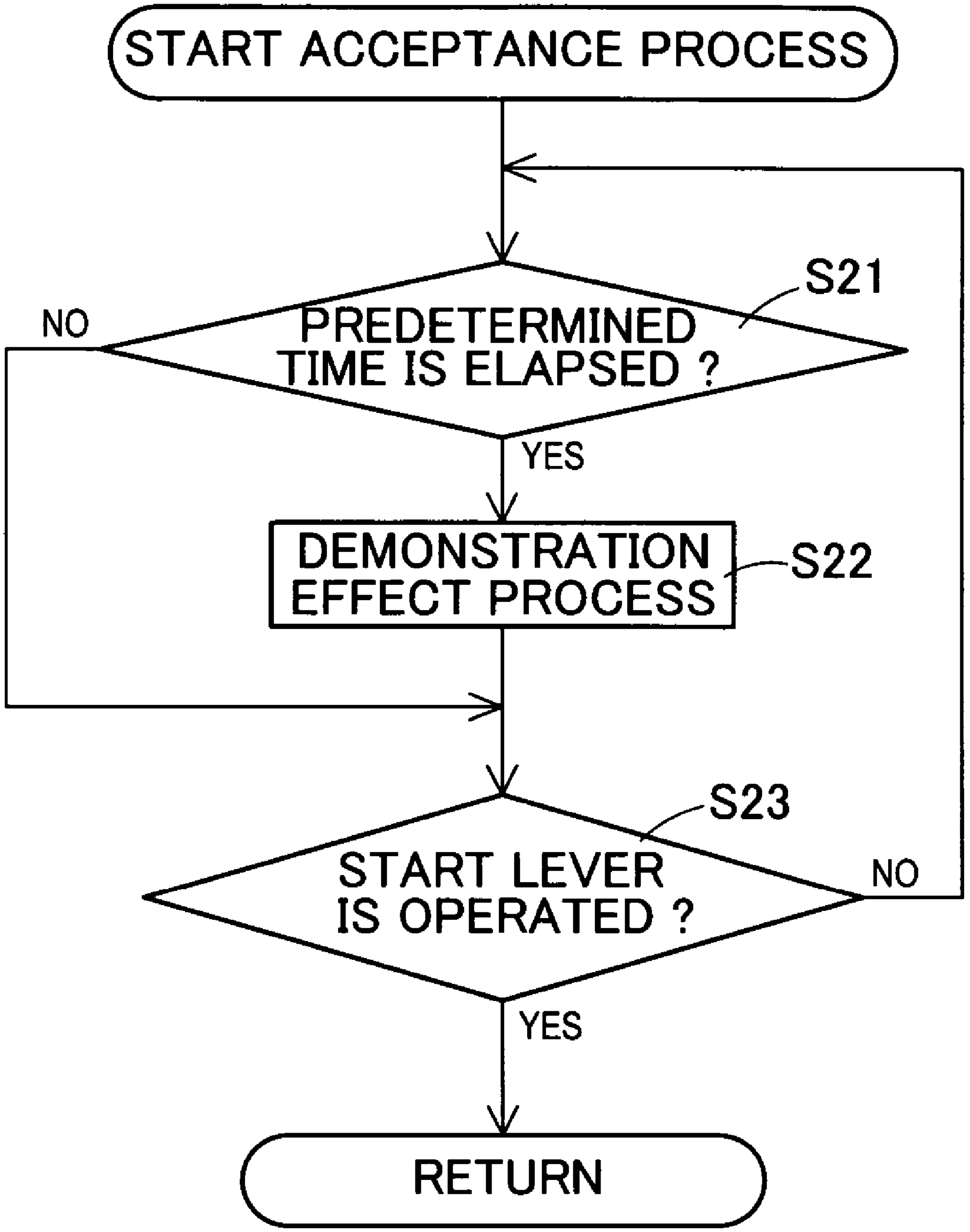
FIG. 15 is a flowchart showing a start acceptance process program.

Next, the start acceptance process program done in the slot machine 1 will be with reference to FIG. 15. FIG. 15 is a flowchart showing a start acceptance process program. In S11 of the main process program shown in FIG. 14, the start acceptance process is done. Concretely, at first, in S21 in FIG. 15, it is determined whether a predetermined time (for example, 15 seconds) is elapsed or not. Here, if it is determined that the predetermined time is not elapsed (S21: NO), procedure directly shifts to S23. On the other hand, if it is determined that the predetermined time is elapsed (S21: YES), the demonstration effect is conducted on the upper liquid crystal display 3 or the lower liquid crystal display 4 in S22, thereafter procedure shifts to S23. And in S23, it is determined whether or not the start lever 17, the SPIN/REPEAT BET button 12, the 1-BET button 11, the 3-BET button 13 or the 5-BET button 14 is operated. Here, if it is determined that the start lever 17 or the above buttons are not operated (S23: NO), procedure returns to S21 and the above processes are repeated. On the other hand, if it is determined that the start lever 17 or the above buttons are operated (S23: YES), procedure returns to the main process program in FIG. 14 even while the demonstration effect is conducted, and procedure shifts to the lottery process in S12.

Here, in determination done in S23, such determination May be done based on the other input signals in addition to the signals output from the start lever 17 and the above buttons.

Next, the lottery process program conducted in the slot machine 1 will be described with reference to FIG. 16. FIG. 16 is a flowchart showing a lottery process program. In S12 of the main process program in FIG. 14, the lottery process is done. Concretely, at first, in S31 in FIG. 16, the symbol determination process is done. Here, the symbols stopped and displayed on the pay line L are determined every each of the variable display portions 22 to 24. Concretely, as mentioned above, three random number values are sampled by the random number sampling circuit 56 corresponding to each of the variable display portions 22 to 24, and the symbols stopped and displayed are determined on the basis of the lottery tables in FIG. 8, by utilizing the code numbers. And if the symbols stopped and displayed on the pay lien L are determined, the winning combination determining process is done in S32, thereafter procedure returns to the main process program in FIG. 14 and shifts to the base game process. Here, in the winning combination determining process, concretely speaking, the winning combination and the payout are determined on the basis of the table in FIG. 9 by utilizing the code numbers obtained in S31.

Next, the base game process program conducted in the slot machine 1 will be described with reference to FIG. 17. FIG. 17 is a flowchart showing a base game process program. In S13 of the main process program in FIG. 14, the base game process is done. Concretely, In S41 in FIG. 17, at first, the symbols are scrolled in the variable display portions 22 to 24, based on the switch signal output from the start switch 57, the spin switch 58, the 1-BET switch 59, the 3-BET switch 60 or the 5-BET switch 61. At that time, since scroll of the symbols displayed on the variable display portions 22 to 24 is done, three reels 220 in the cabinet 2 cannot be seen and recognized through the variable display portions 22 to 24.

And in S42, when the stop buttons 27 to 29 corresponding to the variable display portions 22 to 24 on which the symbols are scrolled are pressed by the player, scroll of the symbols on the variable display portions 22 to 24 is stopped by utilizing the switch signal output from the stop buttons 27 to 29 which are pressed as the trigger signal.

Here, in the embodiment, each of the stop buttons 27 to 29 has no relation with so-called "observation push" which is done for purpose to allow technical intervention by the player. And the switch signal output from each of the stop buttons 27 to 29 is used to the end only as the trigger when the symbols scrolled on the variable display portions 22 to 24 are stopped and displayed. Therefore, the symbols on each of the variable display portions 22 to 24 are stopped and displayed thereon based on only the lottery result obtained in S31 in FIG. 16. In other words, stop operation of the stop buttons 27 to 29 can be utilized as the trigger to execute the effect done until the symbols to be stopped, which are determined by the lottery, are stopped.

And in S43, coins are paid out corresponding to the payout set beforehand based on the table in FIG. 9, according to the symbol combination of the winning combination which is stopped and displayed on the variable display portions 22 to 24 in S42. Here, after the process in S43, procedure returns to the main process program and shifts to S14.

Next, the free game process program conducted in the slot machine 1 will be described with reference to FIG. 18. FIG. 18 is a flowchart showing a free game process program. In S14 of the main process program in FIG. 14, if it is determined that the trigger of the free game is realized (S14: YES), the free game process is done in S15 in FIG. 14. Concretely, at first, procedure shifts to S51 in FIG. 18 and the lottery process in the free game is conducted. Here, in the free game, the symbol stopped and displayed on the pay line L through the variable display portions 22 to 24 is determined every each of the reels 220. Concretely, as mentioned above, three random number values corresponding to the reels 220 are sampled by the random number sampling circuit 56 at the timing that procedure shifts to S51 and the symbols to be stopped and displayed are determined on the basis of the lottery tables in FIG. 10, by utilizing the code numbers. Further, the winning combination is also determined in S51. Concretely speaking, as mentioned, the winning combination and the payout are determined on the basis of the table in FIG. 11, by utilizing the code numbers.

In S52, each of the variable display portions 22 to 24 on the lower liquid crystal display 4 is controlled so as to become transparent, thereby the variable display portions 22 to 24 are made in a state that three reels 220 can be seen and recognized therethrough and rotation of three reels 220 is automatically started. Thereafter, in S53, it is displayed on the lower liquid crystal display 4 the guidance to call player's attention so as to press the stop buttons 27 to 29 corresponding to each of the reels 220. As such guidance, for example, it is conceivable that the message (for example, "switch on") to call player's attention so as to press the stop buttons 27 to 29 corresponding to each of the reels 220 is displayed or blink of the stop buttons 27 to 29 is done.

Thereafter, if the player presses any one of the stop buttons 27 to 29, rotation of three reels 220 is automatically stopped by utilizing the switch signal output from the pressed stop button as the trigger signal. Here, in the embodiment, each of the stop buttons 27 to 29 has no relation with so-called "observation push" which is done for purpose to allow technical intervention by the player. And the switch signal output from each of the stop buttons 27 to 29 is used to the end only as the trigger when the symbols scrolled on the reels 220 (the variable display portions 22 to 24) are stopped and displayed. Therefore, the symbols on each of the reels 220 (the variable display portions 22 to 24) are stopped and displayed thereon based on only the lottery result determined in S51. In other words, stop operation of the stop buttons 27 to 29 can be utilized as the trigger to execute the effect done until the symbols to be stopped, which are determined by the lottery, are stopped. However, in the free game, since the payout expectation value is high (see FIG. 13) and the player can obtain more beneficial state therein than in the base game, probability that the player can obtain the payout every pressing any one of the stop buttons 27 to 29 is high, thereby the player can continuously enjoy the free games.

And after the process in S53 is executed, coins corresponding to the winning combination are paid out in S54. Next, procedure shifts to S55 and it is determined whether the number of times of the free games which are executed reaches to the number of times of the free games determined in S12 in FIG. 14 or not. At that time, if it is determined that the number of times of the free games which are executed does not reach to the number of times of the free games determined in S12 in FIG. 14 (S55: NO), procedure returns to S51 and the above processes are repeated. On the other hand, if it is determined that the number of times of the free games reaches to the number of times determined S12 (S55: YES), the free game process is finished.

Figure 26:
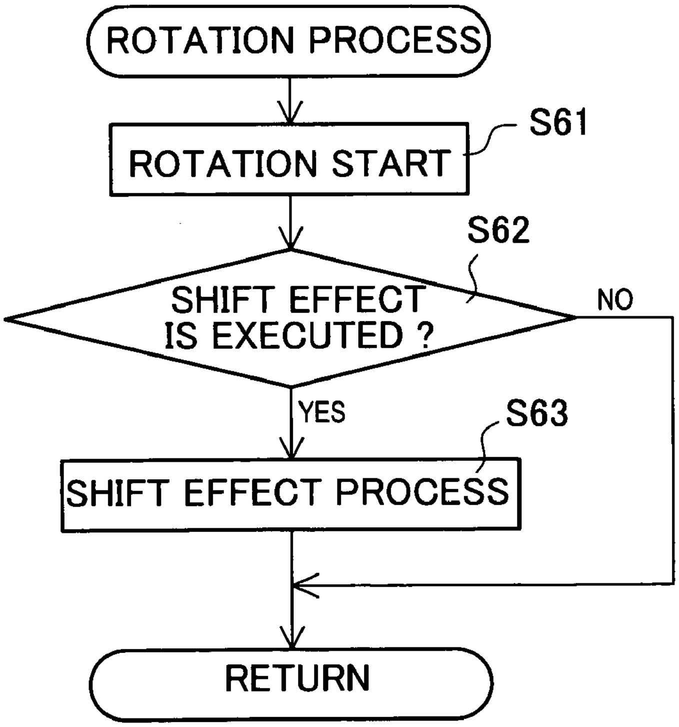
FIG. 26 is a flowchart showing a rotation process program.

Next, the timing of the shift effect process conducted in the slot machine 1 of the embodiment will be described with reference to FIG. 26. FIG. 26 is a flowchart showing a rotation process program. In the flowchart of FIG. 26, the rotation process in S41 of FIG. 17 done in the base game is described in detail in order to clarify the timing that shift effect process is done. That is to say, after the lottery process in S12 of the main process program shown in FIG. 14 is executed, procedure shifts to S61 in the rotation process program shown in FIG. 26 and variable display of three symbol rows 41 to 43 are automatically started on the variable display portions 22 to 24 in the lower liquid crystal display 4. Thereafter, in S62, it is determined whether the shift effect is executed or not. At that time, if it is determined that the shift effect is executed (S62: YES), procedure shifts to S63. And after the shift effect is executed, procedure returns to the base game shown in FIG. 17 and the stop control process is done in S42. On the other hand, if it is determined that the shift effect is not executed (S62: NO), procedure directly returns to the base game shown in FIG. 17 and the stop control process is done in S42.

Figure 25:
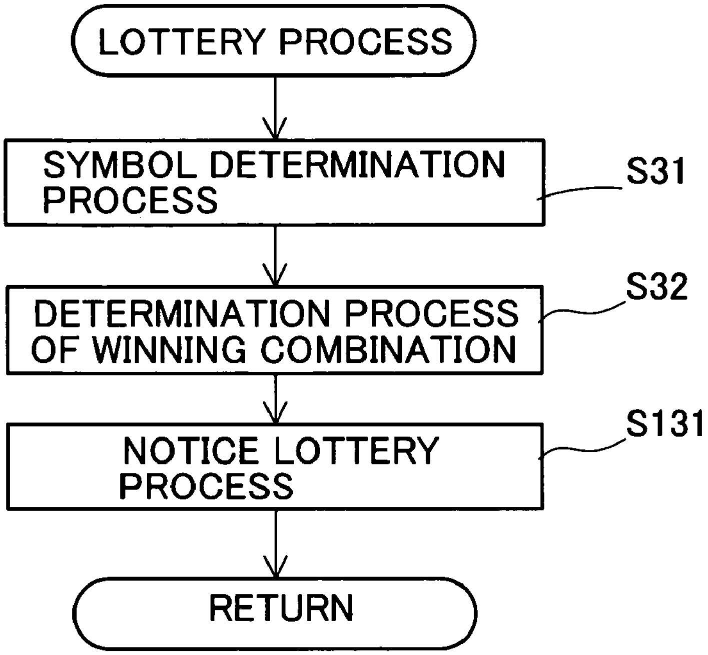
FIG. 25 is a flowchart showing the lottery process program.

Here, in S62 of FIG. 26, determination whether the shift effect is executed or not is done based on the lottery result in S131 of the notice lottery process in the lottery process shown in FIG. 25. FIG. 25 is a flowchart of the lottery process. Here, as for the flowchart of the lottery process, although such flowchart has been already described with reference to FIG. 16, the flowchart of FIG. 25 is represented by adding the notice lottery process to the flowchart in FIG. 16, in order to clarify the timing at which the notice lottery process is conducted. That is to say, as shown in FIG. 25, in the lottery process, after the symbol determination process in S31 and the winning combination determination process in S32, procedure shifts to S131 and the notice lottery process is conducted. In the notice lottery process in S131, it is determined whether the shift effect process is done or not based on the random number value sampled by the random number sampling circuit 56. And if it is determined that shift effect process is done, on-sate of a flag is stored in the RAM 52, and on the other hand, if it is determined that the shift effect process is not done, off-state of the flag stored in the RAM 52 is maintained as it is. Therefore, determination whether the shift effect is done or not in S62 of FIG. 26 is done based on whether the flag stored in the RAM 52 is on-state or off-state. Here, when the start acceptance process in S11 in the main process program shown in FIG. 14 is done, the flag stored in the RAM 52 is always initialized.

Figure 22A:
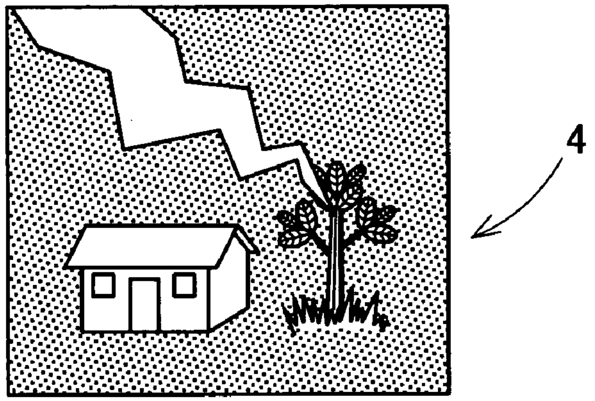
FIGS. 22A, 22B, 22C and 22D are explanatory views showing display contents sequentially displayed on the lower liquid crystal display, in a case that the base game is executed by utilizing three variable display portions.
Figure 22B:
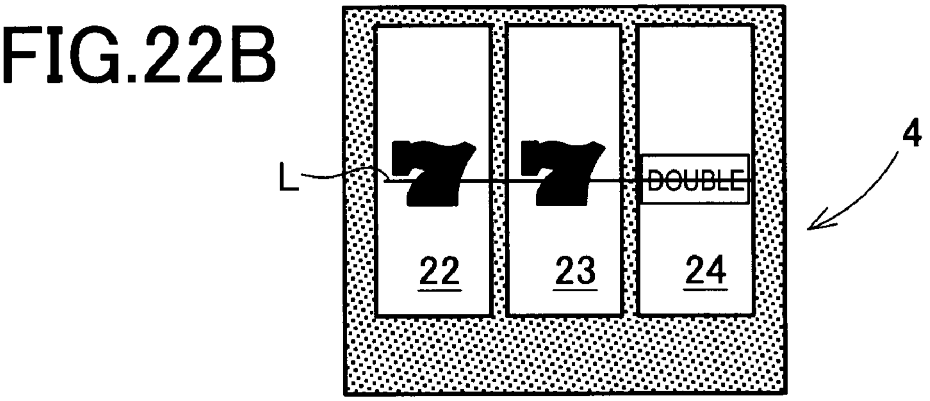
Figure 22C:
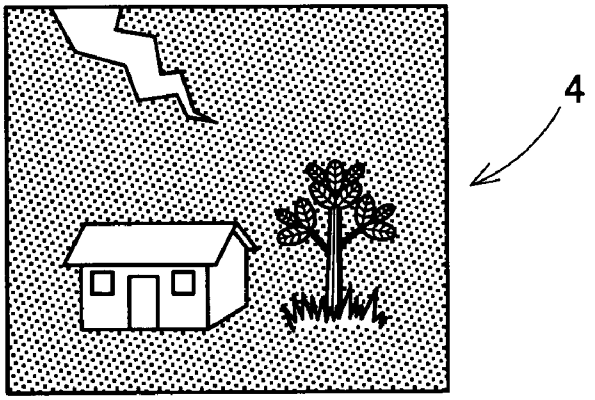
Figure 22D:
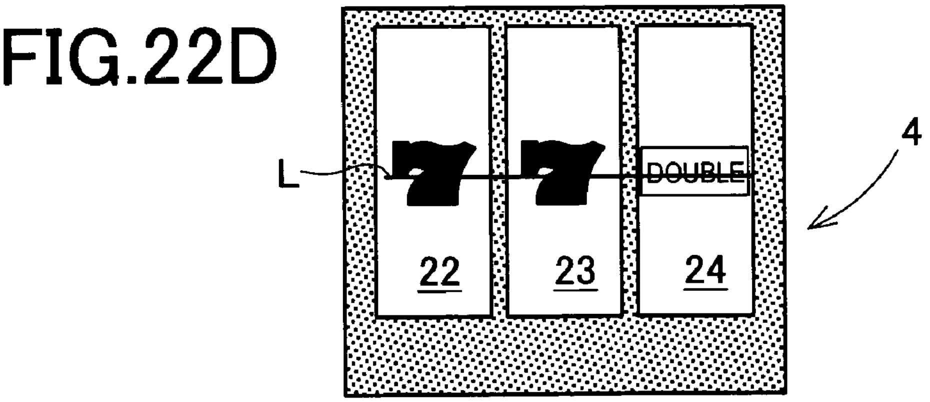

Next, contents of the shift effect process will described. As mentioned, in order that the shift effect process is done, the rotation process in the base game has to be executed. Concretely, in the base game done on the lower liquid crystal display 4, the symbols are scrolled and variably displayed on the variable display portions 22 to 24. And as shown in FIG. 22A, the demonstration effect that the big tree near the house is struck by lightning is displayed on the lower liquid crystal display 4. At that time, effective sounds are output according to blink of lightning and the lower liquid crystal display 4 is controlled so as to become transparent or opaque. Thereby, in the lower liquid crystal display 4, it is reciprocally repeated the state that the reels 220 in the cabinet 2 can be seen and recognized and the state that the reels 220 cannot be seen and recognized. This repetition May be periodically done with a predetermined interval (for example, every 2 seconds) and May be randomly done by utilizing the random number values. The contents of the demonstration effect are stored in the image ROM 82. Thereafter, as shown in FIG. 22B, each of the variable display portions 22 to 24 is made transparent and each of the reels 220 in the cabinet 2 becomes to be able to be seen and recognized through the variable display portions 22 to 24. And as shown in FIG. 22C, the demonstration effect that the lightning goes away from the big tree near the house is displayed on the lower liquid crystal display 4. At that time, effective sounds are output according to blink of lightning and the lower liquid crystal display 4 is controlled so as to become transparent or opaque. Thereby, in the lower liquid crystal display 4, it is reciprocally repeated the state that the reels 220 in the cabinet 2 can be seen and recognized and the state that the reels 220 cannot be seen and recognized. This repetition May be periodically done with a predetermined interval (for example, every 2 seconds) and May be randomly done by utilizing the random number values. The contents of the demonstration effect are stored in the image ROM 82. Thereafter, as shown in FIG. 22D, each of the variable display portions 22 to 24 is made transparent and each of the reels 220 in the cabinet 2 becomes to be able to be seen and recognized through the variable display portions 22 to 24.

Figure 20:
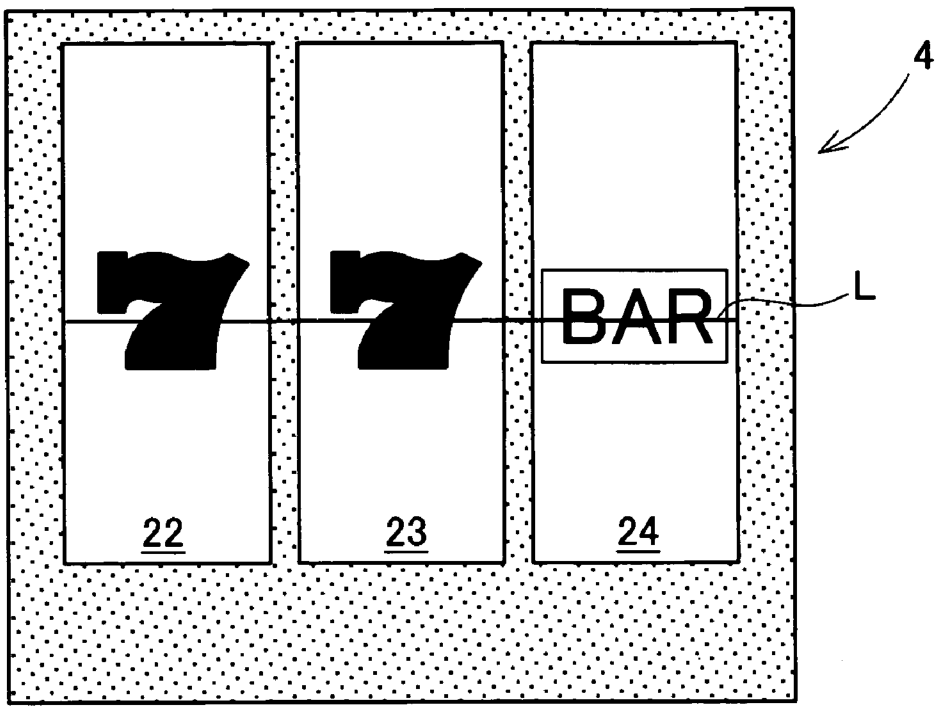
FIG. 20 is an explanatory view showing symbols shown on the lower liquid crystal display when a joker is won, in case that the base game is executed by utilizing three variable display portions.

Further, procedure returns to the base game shown in FIG. 17 and when the stop control process is done in S42, the symbols variable displayed on each of the variable display portions 22 to 24 are automatically stopped. For example, as shown in FIG. 20, the symbols are stopped on the pay line L in the variable display portions 22 to 24.

Figure 21:
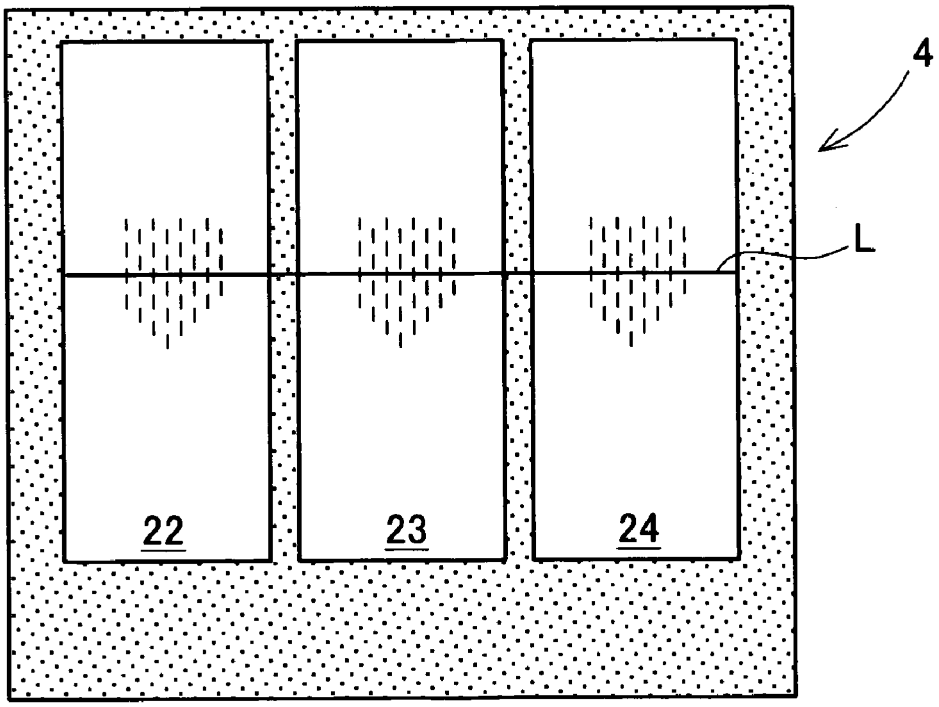
FIG. 21 is an explanatory view showing symbols which are variably displayed while scrolled on the lower liquid crystal display, in a case that the base game is executed by utilizing three variable display portions.

Here, although the above mentioned shift effect process is done in a case that procedure progresses to the shift effect process in S63 after the rotation start process in the base game is conducted (S61), the shift effect process may be done before the rotation start process is executed in the base game (S61). In this case, for example, as shown in FIG. 20, the shift effect process shown in FIGS. 22A to 22D is conducted in the state that the symbols on the variable display portions 22 to 24 are stopped and displayed on the pay line L. Thereafter, as shown in FIG. 21, the symbols are scrolled and variably displayed on each of the variable display portions 22 to 24.

And as for the demonstration effect of the shift effect process, a plurality of patterns for the demonstration effect may be stored in the image ROM 82. At that time, for example, as shown in FIG. 19, three patterns for the demonstration effect may be stored in the image ROM 82 and the demonstration effect may be determined by conducting the lottery using the random number values. That is to say, in FIG. 19, the range of the random number values utilized in the lottery table is set in a range of 0~63. And if the random number value sampled by the random number sampling circuit 56 lies in a range of 0~2, the shift effect process according to the demonstration effect is executed on the basis of the effect pattern 1. And if the random number value sampled by the random number sampling circuit 56 lies in a range of 3~15, the shift effect process according to the demonstration effect is executed on the basis of the effect pattern 2. And if the random number value sampled by the random number sampling circuit 56 lies in a range of 16~63, the shift effect process according to the demonstration effect is executed on the basis of the effect pattern 3. Here, as for the timing at which the random number value is sampled by the random number sampling circuit 56, it is desirable that the random number value is sampled right before procedure shifts to the start acceptance process in FIG. 15 or in the notice lottery process in S131 shown in FIG. 25.

As mentioned in detail, in the slot machine 1 of the embodiment, the base game is executed by controlling the lower liquid crystal display 4 on the cabinet 2 through the CPU 50 (S13 in FIG. 14) and the free game is executed by controlling the reels 220 in the cabinet 2 (S15 in FIG. 14). Thus, the slot machine 1 is the gaming machine that the base game is executed by utilizing the lower liquid crystal display 4 on the cabinet 2 and the free game is executed by utilizing the reels 220 in the cabinet 2. Further, the lower liquid crystal display 4 on the cabinet 2 arranged in front of the reels 220 in the cabinet 2 when seen from the front side of the slot machine 1 is controlled by the CPU 50 so that the shift effect process is conducted (S63 in FIG. 26) through the openings 35A~35C of the diffusion sheet 35 and the openings 36A 36C of the light guiding plate 36 if it is determined to execute the shift effect (S62: YES) which is the effect display utilizing change of light transmittance of the lower liquid crystal display 4 on the cabinet 2. Thereby, the effect conducted by controlling light transmittance of the lower liquid crystal display 4 on the cabinet 2 (see FIGS. 22A and 22C) is executed during the base game in which the lower liquid crystal display 4 on the cabinet 2 is utilized. Concretely, in order to be able to recognize the reels 220 in the cabinet 2, the demonstration effect that the big tree near the house is struck by lightning is displayed and at that time, in the lower liquid crystal display 4, it is reciprocally repeated the state that the reels 220 in the cabinet 2 can be seen and recognized and the state that the reels 220 in the cabinet 2 cannot be seen and recognized, according to blink of lightning. On the other hand except for a case that it is determined to execute the shift effect (S62: YES) which is the effect display utilizing change of light transmittance of the lower liquid crystal display 4 on the cabinet 2 or a case that the free game is executed by utilizing the reels 220 in the cabinet 2, the lower liquid crystal display 4 conceals the reels 220 in the cabinet 2. Therefore, while the base game is conducted by utilizing the lower liquid crystal display 4 on the cabinet 2, the above mentioned effect is conducted by controlling light transmittance of the lower liquid crystal display 4 on the cabinet 2. Thereby, device is done in the display mode that the reels 220 in the cabinet 2 can be seen. As a result, interest for the free games done by the reels 220 can be highly maintained and variegated effects can be done.

In particular, while the base game is conducted by utilizing the lower liquid crystal display 4 on the cabinet 2, if the effect is done by controlling light transmittance of the lower liquid crystal display 4 on the cabinet 2 (for example, if light transmittance coefficient of the lower liquid crystal display 4 is remarkably changed between high and low values), the player can see and recognize the reels 220 in the cabinet 2, the reels 220 having no relation with the base game. Thus, it can be raised expectation concerning with what is conducted thereafter.

Further, if it is determined by the CPU 50 to conduct the effect which is the effect display utilizing change of light transmittance of the lower liquid crystal display 4 on the cabinet 2 (S62: YES), it is executed the effect by controlling light transmittance of the lower liquid crystal display 4 on the cabinet 2. Here, even while the base game is done by utilizing the lower liquid crystal display 4 on the cabinet 2, such effect is not necessarily conducted. Therefore, if such effect is done by controlling light transmittance of the lower liquid crystal display 4, it can be highly raised expectation concerning with what is conducted thereafter.

And while the base game is done by utilizing the lower liquid crystal display 4 on the cabinet 2, the shift effect (see FIG. 21), which is executed by controlling light transmittance of the lower liquid crystal display 4, is conducted when the symbols are scrolled and variable displayed on each of the variable display portions 22 to 24 (see FIG. 26). Thereby, since the shift effect is done while the base game is progressed by utilizing the lower liquid crystal display 4, it can be raised expectation concerning with what is conducted thereafter, by displaying a close relation with the game result of the base game (which means that the symbols are stopped and displayed on the pay line L on each of the variable display portions 22 to 24) utilizing the lower liquid crystal display 4.

Here, the present invention is not limited to the above embodiment and various modifications can be done within the scope of the present invention.

For example, in the slot machine 1 of the embodiment, in the above mentioned effect process, the demonstration effect that the big tree near the house is struck by lightning or lightning goes away is displayed on the lower liquid crystal display 4 (S63 in FIG. 26) and it is reciprocally repeated the state that the reels 220 in the cabinet 2 can be seen and recognized and the state that the reels 220 in the cabinet 2 cannot be seen and recognized, according to blink of lightning, thereby visible state and invisible state of the reels 220 in the cabinet 2 are repeated. However, it is conceivable that the lower liquid crystal display 4 is gradually made transparent and is gradually changed in the visible state that the reels 220 in the cabinet 2 can be seen and recognized therethrough. And the lower liquid crystal display 4 is gradually made opaque and is gradually changed in the invisible state that the reels 220 in the cabinet 2 can not be seen and recognized.

And as for the timing of the shift effect process done in the slot machine 1 of the embodiment, another sample can be explained with reference to FIG. 26. FIG. 26 is a flowchart showing a rotation process program in order to clarify the timing that the shift effect process is done. In the flowchart of FIG. 26, the rotation process in S52 of FIG. 18 done in the free game is described in detail. That is to say, in the free game process of FIG. 18, after the free game process in S51 is executed, procedure shifts to S61 in the rotation process program shown in FIG. 26 and the variable display portions 22 to 24 are made transparent, thereby it is realized the state that three reels 220 can be seen and recognized and three reels 220 are automatically started to rotate. Thereafter, in S62, it is determined whether the shift effect is executed or not. At that ire, if it is determined that the shift effect is executed (S62: YES), procedure shifts to S63. And after the shift effect is executed, procedure returns to the free game shown in FIG. 18 and the stop control process is done in S53. On the other hand, if it is determined that the shift effect is not executed (S62: NO), procedure directly returns to the free game shown in FIG. 18 and the stop control process is done in S53.

Here, in S62 of FIG. 26, determination whether the shift effect is executed or not is done based on the lottery result in S131 of the notice lottery process in the lottery process shown in FIG. 25. FIG. 25 is a flowchart of the lottery process. Here, as for the flowchart of the lottery process, although such flowchart has been already described with reference to FIG. 16, the flowchart of FIG. 25 is represented by adding the notice lottery process to the flowchart in FIG. 16, in order to clarify the timing at which the notice lottery process is conducted. That is to say, as shown in FIG. 25, in the lottery process, after the symbol determination process in S31 and the winning combination determination process in S32, procedure shifts to S131 and the notice lottery process is conducted. In the notice lottery process in S131, it is determined whether the shift effect process is done or not based on the random number value sampled by the random number sampling circuit 56. And if it is determined that shift effect process is done, on-sate of a flag is stored in the RAM 52, and on the other hand, if it is determined that the shift effect process is not done, off-state of the flag stored in the RAM 52 is maintained as it is. Therefore, determination whether the shift effect is done or not in S62 of FIG. 26 is done based on whether the flag stored in the RAM 52 is on-state or off-state. Here, when the start acceptance process in S11 in the main process program shown in FIG. 14 is done, the flag stored in the RAM 52 is always initialized.

Figure 23A:
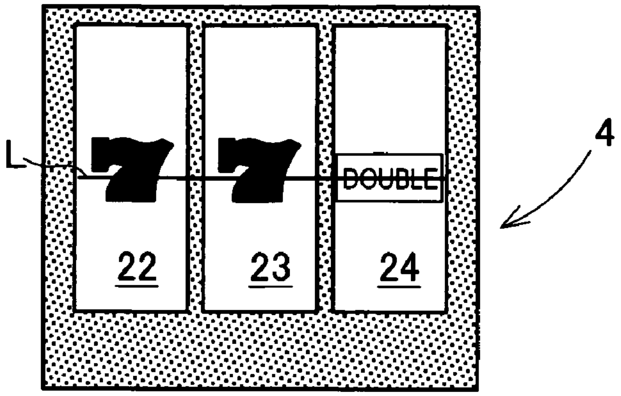
FIGS. 23A, 23B, 23C and 23D are explanatory views showing display contents sequentially displayed on the lower liquid crystal display, in a case that the base game is executed by utilizing three variable display portions.
Figure 23B:
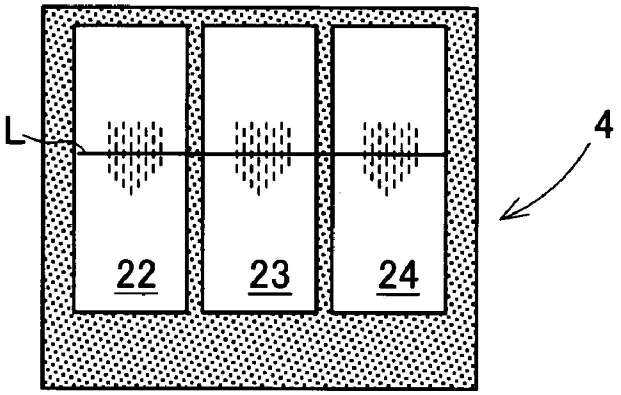
Figure 23C:
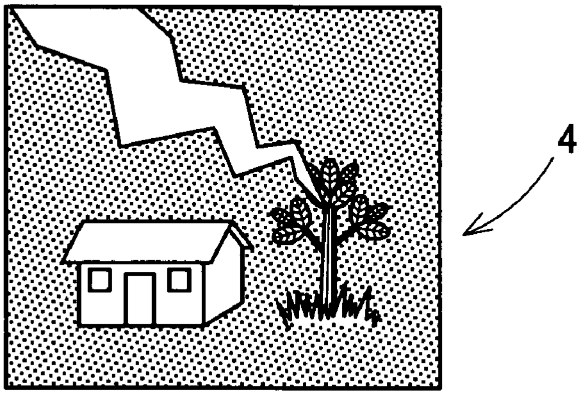
Figure 23D:
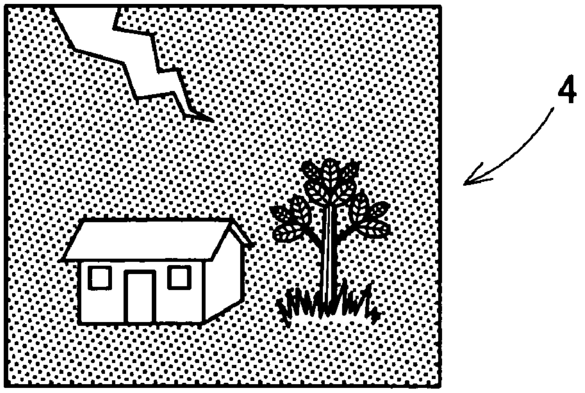

Next, contents of the shift effect process will described. As mentioned, in order that the shift effect process is done, the rotation process in the free game has to be executed. In order that, in the base game done on the lower liquid crystal display 4, the symbols are scrolled and variably displayed on the variable display portions 22 to 24. Thereafter, as shown in FIG. 20, the trigger symbol 97 is stopped and displayed on the pay line L in the variable display portion 23, thereby game condition shifts to the free game from the base game. Here, at that time, any one of the symbols may be stopped and displayed on the pay line of the variable display portions 22 and 24. And game condition shifts to the free game, as shown in FIG. 23A, the variable display portions 22 to 24 are made transparent, thereby it becomes the state that each of the reels 220 in the cabinet 2 can be seen and recognized. Thereafter, rotation start process in the free game is executed (S61) and as shown in FIG. 23B, the symbols rows 141 to 143 formed on the reels 220 are scrolled and variably displayed. Thereafter, when procedure progresses to the shift effect process in S63, as shown in FIG. 23C, the demonstration effect that the big tree near the house is struck by lightning is displayed on the lower liquid crystal display 4. At that time, effective sounds are output according to blink of lightning and the lower liquid crystal display 4 is controlled so as to become transparent or opaque. Thereby, in the lower liquid crystal display 4, it is reciprocally repeated the state that the reels 220 in the cabinet 2 can be seen and recognized and the state that the reels 220 cannot be seen and recognized. This repetition May be periodically done with a predetermined interval (for example, every 2 seconds) and May be randomly done by utilizing the random number values. The contents of the demonstration effect are stored in the image ROM 82. Thereafter, as shown in FIG. 23D, the demonstration effect that the lightning goes away from the big tree near the house is displayed on the lower liquid crystal display 4. At that time, effective sounds are output according to blink of lightning and the lower liquid crystal display 4 is controlled so as to become transparent or opaque. Thereby, in the lower liquid crystal display 4, it is reciprocally repeated the state that the reels 220 in the cabinet 2 can be seen and recognized and the state that the reels 220 cannot be seen and recognized. This repetition May be periodically done with a predetermined interval (for example, every 2 seconds) and may be randomly done by utilizing the random number values. The contents of the demonstration effect are stored in the image ROM 82.

Thereafter, procedure returns to the free game shown in FIG. 18, when the stop control process in S53 is done, rotation of three reels 220 is automatically stopped. For, example, as shown in FIG. 23A, a part of the symbol rows 141 to 143 variably displayed by the reels 220 in the cabinet 2 is stopped and displayed don the pay line L.

Figure 24A:
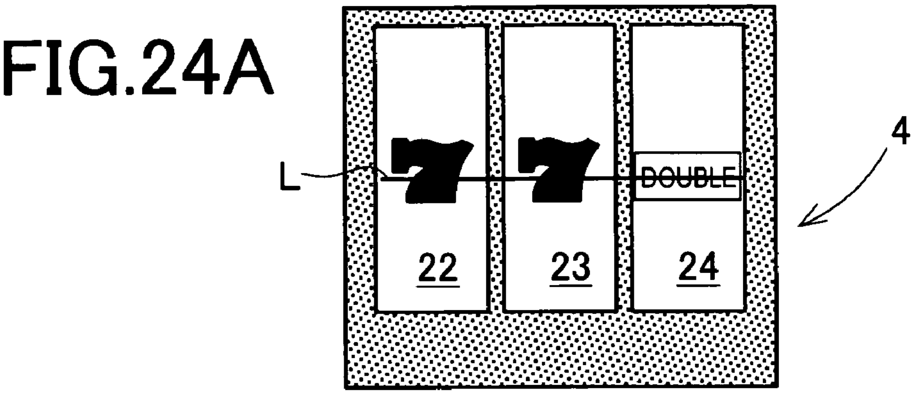
FIGS. 24A, 24B, 24C and 24D are explanatory views showing display contents sequentially displayed on the lower liquid crystal display, in a case that the base game is executed by utilizing three variable display portions.
Figure 24B:
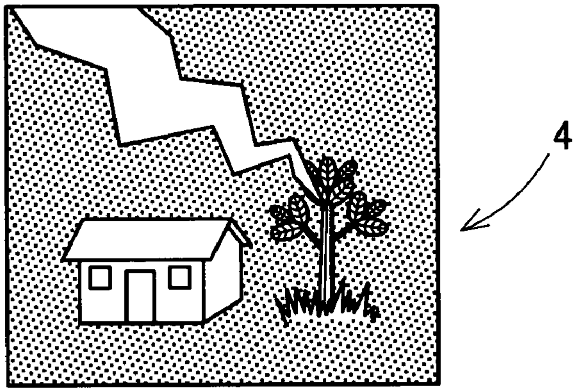
Figure 24C:
Figure 24D:
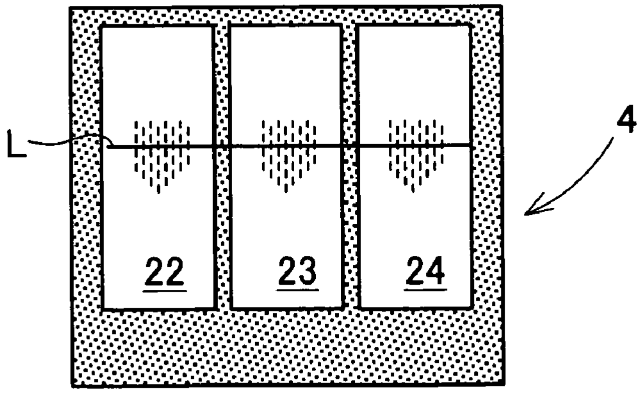

Here, although the above mentioned shift effect is executed when procedure shifts to the shift in S63 after rotation start process in the free game is executed (S61), the shift effect process may be conducted before rotation start process in the free game is executed (S61). In this case, as shown in FIG. 24A, each of the variable display portions 22 to 24 are made transparent and it is realized the state that the reels 220 in the cabinet 2 can be seen and recognized, thereafter as shown in FIG. 24B, the demonstration effect that the big tree near the house is struck by lightning is displayed on the lower liquid crystal display 4. At that time, effective sounds are output according to blink of lightning and the lower liquid crystal display 4 is controlled so as to become transparent or opaque. Thereby, in the lower liquid crystal display 4, it is reciprocally repeated the state that the reels 220 in the cabinet 2 can be seen and recognized and the state that the reels 220 cannot be seen and recognized. This repetition May be periodically done with a predetermined interval (for example, every 2 seconds) and May be randomly done by utilizing the random number values. The contents of the demonstration effect are stored in the image ROM 82. Further, as shown in FIG. 24C, the demonstration effect that the lightning goes away from the big tree near the house is displayed on the lower liquid crystal display 4. At that time, effective sounds are output according to blink of lightning and the lower liquid crystal display 4 is controlled so as to become transparent or opaque. Thereby, in the lower liquid crystal display 4, it is reciprocally repeated the state that the reels 220 in the cabinet 2 can be seen and recognized and the state that the reels 220 cannot be seen and recognized. This repetition May be periodically done with a predetermined interval (for example, every 2 seconds) and may be randomly done by utilizing the random number values. The contents of the demonstration effect are stored in the image ROM 82. Thereafter, as shown in FIG. 24D, the symbols rows 141 to 143 formed on the reels 220 are scrolled and variably displayed.

And in the slot machine 1 of the embodiment, although the symbols to be stopped on the pay line L are determined every each of the variable display portions 22 to 24 based on the random number value sampled by the random number sampling circuit 56 in the base game (see FIG. 8), all symbols to be stopped on the pay line L in the variable display portions 22 to 24 may be determined according to the random number value sampled by the random number sampling circuit 56. In order that, the lottery table of the winning combinations shown in FIG. 27 is utilized. FIG. 27 is an explanatory view showing a lottery table of the winning combinations and payouts when the base game is done by utilizing three variable display portions.

In FIG. 27, the random number value range utilized in the lottery table lies in 0~1270. If the random number value sampled by the random number sampling circuit 56 lies in a range of 0~9, the joker is won, thereby the trigger of the free game is obtained. In this case, the trigger symbol 97 is stopped and displayed on the pay line L in the variable display portion 23, thereby game condition can be shifted to the free game.

And if the random number value sampled by the random number sampling circuit 56 lies in a range of 10~32, the winning combination "7-7-7" is won and the payout thereof is 100 coins. In this case, the symbol seven 94 is stopped and displayed on the pay line L in each of the variable display portions 22 to 24. Similarly, if the random number value sampled lies in a range of 33~35, the winning combination "3BAR-3BAR-3BAR" is won and the payout thereof is 5 coins. In this case, the triple BAR 91 is stopped and displayed on the pay line L in each of the variable display portions 22 to 24. And similarly, if the random number value sampled lies in a range of 36~58, the winning combination "2BAR-2BAR-2BAR" is won and the payout thereof is 3 coins. In this case, the double BAR 93 is stopped and displayed on the pay line L in each of the variable display portions 22 to 24. Similarly, if the random number value samples lies in a range of 59~203, the winning combination "BAR-BAR-BAR" is won and the payout thereof is 2 coins. In this case, the single BAR 95 is stopped and displayed on the pay line L in each of the variable display portions 22 to 24. Similarly, if the random number value samples lies in a range of 204~257, the winning combination "cherry-cherry-cherry" is won and the payout thereof is 1 coin In this case, the cherry 92 is stopped and displayed on the pay line L in each of the variable display portions 22 to 24.

Here, if the random number value sampled lies in a range of 258~1270, the winning combinations is lost. In this case, the symbol combination other than the above mentioned combinations is stopped and displayed on the pay line L and the payout thereof is nothing.

And in the slot machine 1 of the embodiment, although the symbols stopped and displayed on the pay line L through the variable display portions 22 to 24 are determined every each of the reels 220 in the free game based on the random number values sampled by the random number sampling circuit 56 (see FIG. 10), all symbols stopped and displayed on the pay line L through the variable display portions 22 to 24 may be determined based on the random number values sampled by the random number sampling circuit 56. To realize this, the lottery table shown in FIG. 28 is utilized. FIG. 28 is an explanatory view of a lottery table showing correspondence between winning combinations and payouts when the free game is conducted while utilizing three variable display portions and reels.

In FIG. 28, the random number value range lies in 0~127. And if the random number value sampled by the random number sampling circuit 56 lies in a range of 0~11, the winning combination "7-7-Tr" is won and the payout thereof is 300 coins. In this case, the seven symbol 191, the seven symbol 191 and the triple symbol 192 are stopped and displayed on the pay line L. Similarly, if the random number value sampled lies in a range of 12~49, the winning combination "7-7-Do" is won and the payout thereof is 200 coins. In this case, the seven symbol 192, the seven symbol 191 and the double symbol 193 are stopped and displayed on the pay line L. And similarly, if the random number value sampled lies in a range of 50~87, the winning combination "7-7-7" is won and the payout thereof is 100 coins. In this case, the seven symbol 191, the seven symbol 191 and the seven symbol 191 are stopped and displayed on the pay line L.

Here, if the random number value sampled lies in a range of 88~127, the winning combination is lost. In this case, the symbol combination other than the above mentioned combinations is stopped and displayed on the pay line L. The payout is nothing.

And in the slot machine 1 of the embodiment, although the free game is conducted as the second game, the present invention is not limited to this. For example, the so-called second game may be done continuously to the base game.

And in the slot machine 1 of the embodiment, although the game utilizing the symbols is done in the base game and the free game (see FIGS. 6 and 7), the present invention is not limited to this. For example, the game utilizing cards such as poker may be conducted.

Further, in the lower liquid crystal display 4 of the slot machine 1 of the embodiment, as shown in FIG. 3, the variable display portion 22 (see FIG. 1) is constructed by superimposing the openings 35A~38A so as to coincide with each other, and the variable display portion 23 (see FIG. 1) is constructed by superimposing the openings 35B~38B so as to coincide with each other and the variable display portion 24 (see FIG. 1) is constructed by superimposing the openings 35C~38C so as to coincide with each other, thereby the light transmitting areas to retain visibility of the variable display portions 22 to 24 are formed. And shapes of three light transmitting areas corresponding to the variable display portions 22 to 24 have rectangular shapes so as to coincide with the width of each reel 220. The present invention is not limited to this. For example, the entire plane of the lower liquid crystal display 4 may be transparent.

And in the lower liquid crystal display 4 of the slot machine 1 of the embodiment, the symbol rows 41~43 shown in FIG. 6 are scrolled, stopped and displayed on the variable display portions 22 to 24 which are made opaque in the base game, and the symbol rows shown in FIG. 7 are scrolled, stopped and displayed through the variable display portions 22 to 24 which are made transparent in the free game. At this point of view, the symbol rows 41~43 shown in FIG. 6 may be scrolled, stopped and displayed on the areas other than the variable display portions 22 to 24 in the base game.

Further, in the slot machine 1 of the embodiment, by controlling light transmittance of the lower liquid crystal display 4, it is reciprocally repeated the state that the reels 220 in the cabinet 2 can be seen and recognized and the state that the reels 220 in the cabinet 2 cannot be seen and recognized. At this point of view, the shutter mechanism may be arranged between the lower liquid crystal display 4 and the reels 220 and it may be reciprocally repeated the state that the reels 220 in the cabinet 2 can be seen and recognized and the state that the reels 220 in the cabinet 2 cannot be seen and recognized, by utilizing such shutter mechanism.

And in the slot machine 1 of the embodiment, the lower liquid crystal display 4 is utilized for changing two states, in one of which the reels 220 can be seen and recognized and in another of which the reels 220 cannot be seen and recognized. The present invention is not limited to this. For example, the transparent EL and the like may be utilized instead of the lower liquid crystal display 4.

What is claimed is:

1. A gaming machine with a cabinet, comprising:

an effect display device for displaying either an effect or a first game thereon, the effect display device being constructed from a liquid crystal display arranged in front of the cabinet, the liquid crystal display including a plurality of variable display portions;

a variable display device arranged behind the effect display device;

a game controller for executing the first game utilizing the effect display device and a second game utilizing the variable display device; and a display controller for controlling light transmittance of the effect display device so that the variable display device is selectively seen and recognized through the effect display device;

wherein the liquid crystal display includes a transparent liquid crystal panel, a diffusion sheet with first openings and a light guiding plate with second openings, both first openings and the second openings constructing the variable display portions, wherein the display controller alternatively executes the effect and displays the first game when the game controller determines to alternatively conduct the effect and display the first game while simultaneously concealing the variable display device or the display controller alternatively executes the effect and the second game in which the variable display device is seen and recognized through the first and second openings when the game controller determines to alternatively conduct the effect and display the second game while simultaneously prohibiting display of the first game.

2. The gaming machine according to claim 1, wherein the display controller controls the light transmittance of the effect display device and conducts the effect when the game controller changes display contents of the effect display device in the first game.

3. The gaming machine according to claim 1, wherein the effect display device is constructed from a liquid crystal display arranged in front of a cabinet, and wherein the variable display device is constructed from a plurality of reels rotatably supported behind the liquid crystal display in the cabinet.

4. The gaming machine according to claim 3, wherein a plurality of variable display portions, each of which corresponds to each reel, are formed in the liquid crystal display.

5. The gaming machine according to claim 3, wherein the effect is a demonstration effect conducted on the liquid crystal display.

6. The gaming machine according to claim 5, wherein the display controller controls the liquid crystal display so as to become a transparent state and an opaque state when the demonstration effect is conducted.

7. The gaming machine according to claim 6, wherein when the liquid crystal display becomes the transparent state, each of the reels is seen and recognized and when the liquid crystal display becomes the opaque state, each of the reels is not seen and recognized.

8. The gaming machine according to claim 6, wherein the transparent state and the opaque state are repeated with a predetermined period.

9. The gaming machine according to claim 4, each of the variable display portions is made transparent by the display controller so that each of the reels is seen and recognized while the second game is executed.

10. The gaming machine according to claim 5, further comprising a memory for storing a plurality of effect patterns corresponding to the demonstration effect; wherein the display controller selects one effect pattern among the effect patterns stored in the memory and controls the liquid crystal display so as to conduct the demonstration effect.

11. A gaming machine with a cabinet, comprising:

a video display device for displaying either an effect or a first game thereon, the video display device being constructed from a liquid crystal display arranged in front of the cabinet, the liquid crystal display including a plurality of variable display portions;

a plurality of mechanical reels arranged behind the video display device;

a game controller for executing the first game utilizing the video display device and a second game utilizing the mechanical reels, the second game being conducted based on a game result of the first game; and a display controller for controlling light transmittance of the video display device so that the mechanical reels are selectively seen and recognized through the video display device;

wherein the liquid crystal display includes a transparent liquid crystal panel, a diffusion sheet with first openings and a light guiding plate with second openings, both first openings and the second openings constructing the variable display portions, wherein the display controller alternatively executes the effect and displays the first game when the game controller determines to alternatively conduct the effect and display the first game while simultaneously concealing the mechanical reels or the display controller alternatively executes the effect and the second game in which the mechanical reels are seen and recognized through the first and second openings when the game controller determines to alternatively conduct the effect and display the second game while simultaneously prohibiting display of the first game.

* * * * *